(12) United States Patent
Kitagaki et al.

(10) Patent No.: US 7,477,587 B2
(45) Date of Patent: Jan. 13, 2009

(54) INFORMATION-RECORDING METHOD AND INFORMATION-RECORDING MEDIUM

(75) Inventors: Naoki Kitagaki, Moriya (JP); Makoto Miyamoto, Moriya (JP)

(73) Assignee: Hitachi Maxwell, Ltd., Osaka (JP)

( * ) Notice: Subject to any disclaimer, the term of this patent is extended or adjusted under 35 U.S.C. 154(b) by 465 days.

(21) Appl. No.: 10/734,148

(22) Filed: Dec. 15, 2003

(65) Prior Publication Data

US 2004/0125728 A1 Jul. 1, 2004

(30) Foreign Application Priority Data

Dec. 16, 2002 (JP) ............................. 2002-364493

(51) Int. Cl.
*G11B 7/00* (2006.01)
(52) U.S. Cl. .................. 369/59.11; 369/59.12; 369/116
(58) Field of Classification Search .............. 369/59.11, 369/59.12, 116
See application file for complete search history.

(56) References Cited

U.S. PATENT DOCUMENTS

| | | | | |
|---|---|---|---|---|
| 5,109,373 | A * | 4/1992 | Ohno et al. | 369/100 |
| 5,291,470 | A * | 3/1994 | Nishiuchi et al. | 369/59.11 |
| 5,412,626 | A * | 5/1995 | Ohno et al. | 369/13.24 |
| 5,818,808 | A * | 10/1998 | Takada et al. | 369/116 |
| 6,404,713 | B1 * | 6/2002 | Ueki | 369/47.53 |
| 6,442,119 | B1 * | 8/2002 | Sunagawa | 369/47.53 |
| 6,459,666 | B1 * | 10/2002 | Yokoi | 369/47.15 |
| 6,504,806 | B1 * | 1/2003 | Nakajo | 369/59.12 |
| 6,608,806 | B2 * | 8/2003 | Miyamoto et al. | 369/59.11 |
| 6,842,412 | B2 * | 1/2005 | Ushiyama et al. | 369/47.53 |
| 7,068,579 | B2 | 6/2006 | Tasaka et al. | |
| 2002/0003762 | A1 * | 1/2002 | Dekker | 369/53.3 |
| 2002/0021643 | A1 * | 2/2002 | Miura et al. | 369/59.11 |
| 2002/0196324 | A1 * | 12/2002 | Abe et al. | 347/179 |
| 2003/0090981 | A1 * | 5/2003 | Yokoi | 369/59.11 |
| 2003/0156519 | A1 * | 8/2003 | Yokoi | 369/59.11 |
| 2004/0105372 | A1 * | 6/2004 | Shintani et al. | 369/100 |
| 2004/0145993 | A1 * | 7/2004 | Kurebayashi et al. | 369/53.37 |
| 2006/0044968 | A1 | 3/2006 | Narumi et al. | |
| 2006/0140097 | A1 | 6/2006 | Tasaka et al. | |

FOREIGN PATENT DOCUMENTS

| | | |
|---|---|---|
| CN | 1708790 A | 12/2005 |
| JP | A 62-259229 | 11/1987 |
| JP | A-1-166343 | 6/1989 |

(Continued)

*Primary Examiner*—Tan X Dinh
*Assistant Examiner*—Linh T Nguyen
(74) *Attorney, Agent, or Firm*—Oliff & Berridge, PLC

(57) ABSTRACT

An information-recording method includes the steps of moving a light beam at a selected linear velocity relative to the information-recording medium; controlling the light beam to generate a multi-pulse having at least three power levels of a first power level Ph, a second power level Pl which is lower than the first power level, and a third power level Pm which is intermediate therebetween, the multi-pulse being repeatedly modulated between the first power level Ph and the third power level Pm; adjusting the third power level Pm in response to the selected linear velocity; and recording the information by irradiating the information-recording medium with the controlled light beam. Recording compatibility can be secured for information-recording apparatuses different in recording linear velocity and laser source characteristic.

20 Claims, 18 Drawing Sheets

(1) RECORDING WAVEFORM UPON LOW SPEED RECORDING (2) RECORDING WAVEFORM UPON HIGH SPEED RECORDING

FOREIGN PATENT DOCUMENTS

| | | |
|---|---|---|
| JP | A-2-278518 | 11/1990 |
| JP | A 3-185629 | 8/1991 |
| JP | A-9-7176 | 1/1997 |
| JP | A-2000-155945 | 6/2000 |
| WO | WO 02/065462 A1 | 8/2002 |
| WO | WO 02/089123 | 11/2002 |

* cited by examiner (1) RECORDING WAVEFORM UPON LOW SPEED RECORDING (2) RECORDING WAVEFORM UPON HIGH SPEED RECORDING (3) RECORDING WAVEFORM UPON HIGHER SPEED RECORDING

INFORMATION-RECORDING METHOD AND INFORMATION-RECORDING MEDIUM

BACKGROUND OF THE INVENTION

1. Field of the Invention

The present invention relates to a method for recording information on an information-recording medium capable of recording the information by irradiating a laser beam onto the information-recording medium, and the information-recording medium to be used therefor. In particular, the present invention relates to an information-recording method which makes it possible to secure the compatibility of recording between information-recording media and apparatuses in which rising times and falling times of laser powers are different from each other, and the information-recording media to be used therefor. Further, the present invention-relates to a light power control method and an information-recording method which make it possible to easily optimize laser powers for apparatuses having different recording linear velocities, and an information-recording medium to be used therefor.

2. Description of the Related Art

In recent years, the market of read-only optical disks including, for example, DVD-ROM and DVD-Video is expanded. On the other hand, rewritable DVD's including, for example, DVD-RAM, DVD-RW, and DVD-+RW are introduced into the market, and the market thereof is expanding for backup media for computers and image-recording media with which VTR may be substituted. In these several years, the demand of the market has increased for the improvement in the access speed and the transfer rate of recordable DVD's.

The method for recording information on the optical disk includes the CLV (Constant Linear Velocity) system and the CAV (Constant Angular velocity) system. The CLV system resides in such a control method that the number of revolutions of the optical disk, i.e., the relative velocity between the laser beam and the optical disk is constant. On the other hand, the CAV system resides in such a system that the angular velocity, which is used to rotate the optical disk, is made constant to control the rotation.

The CLV system has the following features. (1) The signal processing circuit can be extremely simplified, because the data transfer rate is always constant during the recording and reproduction. (2) When the laser beam is moved in the radial direction of the optical disk, it is necessary that the number of revolutions of the motor is controlled again depending on the radial position. Therefore, the access speed is greatly lowered.

The CAV system has the following features. (1) The signal processing circuit is large-sized, because the data transfer rate differs depending on the radial position during the recording and reproduction. (2) It is possible to effect the high speed access, because it is unnecessary that the number of revolutions of the motor is controlled again depending on the radial position when the laser beam is moved in the radial direction of the optical disk.

The phase-change recording system is adopted for recordable DVD media such as DVD-RAM and DVD-RW on which information is recordable and erasable. In the case of the phase-change recording system, the recording is basically performed such that pieces of information of "0" and "1" are allowed to correspond to the crystal and the amorphous. Recorded "0" and "1" can be detected by radiating the laser beam to the crystallized portion and the amorphous portion and effecting the reproduction based on the reflected light beam.

In order to bring about the amorphous state at a predetermined position, the heating is effected so that the temperature of the recording layer is not less than the melting point of the recording layer material by radiating a laser beam having a relatively high power. On the other hand, in order to bring about the crystalline state at a predetermined position, the heating is effected so that the temperature of the recording layer is in the vicinity of the crystallization temperature of not more than the melting point of the recording layer material by radiating a laser beam having a relatively low power. By dosing so, it is possible to reversibly change the amorphous state and the crystalline state.

A phenomenon called "recrystallization" occurs in the phase-change recording, in which the crystal growth takes place from the outer edge of the melted area during the cooling process which occurs immediately after the heating of the recording layer material to the temperature of not less than the melting point by means of the laser beam, and the size of the recording mark is consequently decreased. In order to suppress the deterioration of the shape of the recording mark caused by the recrystallization, the following method is generally adopted as described, for example, in Japanese Patent Application Laid-open Nos. 62-259229 and 3-185629. That is, the recording power is not radiated in a direct current manner, but the power is once lowered after the radiation of the recording power so that the radiation is effected in a form of pulse sequence. The design or construction of the recording pulse sequence is referred to as "recording strategy".

The optimization of the recording power may be explained as exemplified by a drive for DVD-RAM. That is, the data is subjected to the trial writing by using a value of the recording power written on the disk, and the recording power is finely adjusted so that the error rate in the trial writing data is minimized. Accordingly, the recording power is optimized.

In the case of the rewritable information-recording medium such as the optical disk, it is extremely important to secure the compatibility or the interchangeability with respect to the information-recording apparatuses based on various standards and produced by various manufacturers. For example, the DVD-RAM. medium may be exemplified as follows. A DVD-RAM drive, which is adapted to the ×2 speed based on the CLV rotation control (data transfer rate: 22 Mbps, linear velocity: 8.2 m/s), is already present in the market. However, in order to satisfy the demand of the market for the improvement in the transfer rate and the access speed, it is considered that those dominantly used in future may be drives adapted to CLV in which the recording linear velocity is enhanced and drives adapted to CAV. Therefore, it is extremely important and indispensable for the benefit of consumers to guarantee the compatibility of the recording between the drive adapted to CAV and the drive adapted to the CLV in which the recording linear velocity and the transfer rate are different from each other, or between the drives of which the laser light sources are different from each other in the response characteristic.

However, it is necessary to increase the frequency of the recording signal as the recording linear velocity is increased and the data transfer rate is raised. When the laser beam is pulse-modulated and radiated as described above, the time width of each of the pulses for constructing the pulse sequence is extremely shortened. On the other hand, the laser light-emitting element requires a certain period of time from the application of the driving current to the arrival of the light emission intensity at the intensity corresponding to the concerning current value. Therefore, if the width of the pulse becomes shorter than the period of time which is required until the light emission intensity of the light-emitting element arrives at the intensity corresponding to the driving current value in order to enhance the transfer rate, the laser light emission corresponding to each pulse is attenuated before the arrival at the peak value. As a result, the energy per unit area, which is applied to the recording medium by the laser power, is deviated from the optimum value. Further, the shape of the recording mark to be written on the recording medium is distorted, and it is consequently impossible to record and reproduce information correctly. In particular, the following problem arises. That is, when the linear velocity is increased, it is impossible to reliably record information in the case of the conventional recording strategy which uses any conventional pulse sequence.

On the other hand, the period of time, in which the light emission intensity arrives at the intensity corresponding to the current value after the driving current for the light-emitting element is applied, greatly differs depending on the type of the light-emitting element carried on the information-recording apparatus even when the wavelength for the laser light-emitting element is identical. Therefore, even when the recording is performed in accordance with an identical strategy, the energy per unit area, which is applied to the recording, is deviated from the optimum value depending on the type of the light-emitting element. Further, the shape of the recording mark to be written on the recording medium is distorted, and it is consequently impossible to record and reproduce information correctly. That is, there is no guarantee to record any identical recording mark because of the difference in the performance of the recording apparatus to be used, especially in the response characteristic of the laser light source even when any identical recording strategy is used.

The setting of the power is extremely important when information is recorded on the recording medium as described above. However, the situation is varied in a complicated manner depending on the unsaturation phenomenon of the laser power due to the recording linear velocity as well as on the difference in the rising time and the falling time of the laser power depending on the type of the light-emitting element. Therefore, it is not easy to establish the optimum power for the information-recording apparatus.

SUMMARY OF THE INVENTION

Therefore, a first object of the present invention is to solve the problems as described above and provide an information-recording method and an information-recording medium to be used therefor in which the optimum recording laser power can be established with ease in an information-recording apparatus when the linear velocity during the data recording and the data transfer rate are increased.

A second object of the present invention is to solve the problems as described above and provide an information-recording method and an information-recording medium to be used therefor in which the recording compatibility can be secured even between information-recording apparatuses which carry light-emitting elements having different rising times and different falling times of the laser powers.

A third object of the present invention is to solve the problems as described above and provide an information-recording method and an information-recording medium to be used therefor in which the optimum recording laser power can be established with ease in an information-recording apparatus when the linear velocity during the data recording and the data transfer rate are increased, and the recording compatibility can be secured on condition that the influence is taken into account between information-recording apparatuses which carry light-emitting elements having different rising times and different falling times of the laser powers.

A fourth object of the present invention is to provide a light power control method which makes it possible to control the light power so that ideal recording marks are successfully formed without depending on the linear velocity and the performance of a laser to be used when information is recorded on an information-recording medium by irradiating the information-recording medium with a laser beam including any multi-pulse.

In order to solve the problems as described above, the present inventors have completed a recording method in which the optimum recording power can be established with ease when the recording linear velocity is increased. Further, the present inventors have completed the following information-recording method and the following information-recording medium to be used therefor in order to secure the recording compatibility for information-recording apparatus is having different linear velocities of the recording and the information-recording medium to be used therefor.

According to a first aspect of the present invention, there is provided an information-recording method for recording information on an information-recording medium, the information-recording method comprising:

moving a light beam at a selected linear velocity relative to the information-recording medium;

controlling the light beam to generate a multi-pulse having at least three power levels of a first power level Ph, a second power level Pl which is lower than the first power level, and a third power level Pm which is intermediate therebetween, the multi-pulse being repeatedly modulated between the first power level Ph and the third power level Pm;

adjusting the third power level Pm in response to the selected linear velocity; and recording the information by irradiating the information-recording medium with the controlled light beam including the adjusted third power level to change a state of an irradiated portion of the information-recording medium.

According to the knowledge of the present inventors, the unsaturation of the laser power occurs when the recording linear velocity is increased, the data transfer rate is raised, and the clock length of the recording data is shortened. As a result of the unsaturation of the laser power, the energy of the laser power of the recording pulse, which exceeds the optimum value, is applied to the information-recording medium. The term "unsaturation of the laser power" herein refers to such a phenomenon that the laser power cannot follow the driving signal due to increase of the frequency of the driving signal for the laser, in which, for example, the rising and/or the falling of the laser power is delayed, and/or any intended and designed power is not generated. In the present invention, as shown in FIGS. 20A to 20C, the energy of the laser power of the recording pulse can be maintained at the optimum value by changing the third power level Pm in response to the data transfer rate or the clock length of the recording data. FIG. 20A shows a power level (capable of being regarded as "driving signal level", as well) adopted when the linear velocity is low. The multi-pulse is repeatedly modulated between the first power level Ph (amorphous level) and the third power level Pm. The second power level Pl (crystallization level) is approximately the same as the third power level Pm. When the linear velocity is increased, then the third power level Pm is higher than the second power level Pl, and the ratio Pm/Ph is also increased to be higher than that obtained when the linear velocity is low as shown in FIG. 20B. When the linear velocity is further increased, the third power level Pm and the ratio Pm/Ph are further increased as shown in FIG. 20C. When the low power level of the multi-pulse is adjusted in response to the linear velocity as described above, it is possible to form satisfactory recording marks by applying the certain or constant energy to the information-recording medium even at any linear velocity with any laser having any response characteristic. Accordingly, it is possible to secure the recording compatibility in information-recording apparatuses in which the recording linear velocity and the rising time and the falling time of the laser power are different from each other.

In the recording method of the present invention, the third power level Pm may be adjusted so that the third power level Pm is increased in proportion to the linear velocity. If any conventional method is used, it is necessary to separately determine three optimum powers respectively so that the error rate is minimized by changing the laser power value to be originally used, when the optimum values of the laser powers Ph, Pl, and Pm are determined. In the present invention, the optimum value of the laser power Pm can be determined in proportion to the linear velocity. Therefore, the laser powers, for each of which the optimum value is determined by actually changing the value of the recording laser power, are decreased into two of Ph and Pl. Therefore, it is possible to easily establish the optimum recording powers.

In the present invention, a ratio Pm/Ph of the third power level Pm with respect to the first power level Ph may be adjusted in response to the linear velocity. The integrated energy of the light, which is applied to the information-recording medium by using the multi-pulse, is determined by the third power level Pm and the first power level Ph. Further, the unsaturation state of the laser is also changed depending on the magnitude of the first power level Ph to be modulated. Therefore, when the value of Pm/Ph is changed in response to the recording linear velocity, it is easier to adjust the power during the recording based on the use of the multi-pulse.

In the present invention, the ratio Pm/Ph of the third power level Pm with respect to the first power level Ph may be adjusted so that the ratio Pm/Ph is increased in proportion to the linear velocity. By doing so, it is possible to establish the optimum recording power more easily.

A ratio $(Pm-Pl)/(Ph-Pl)$ of a difference between the third power level Pm and the second power level Pl with respect to a difference between the first power level Ph and the second power level Pl may be adjusted in response to the linear velocity. $(Pm-Pl)/(Ph-Pl)$ is a parameter to represent the unsaturation state of the laser power as described later on. When this parameter is used, it is possible to optimize the recording power based on the use of the multi-pulse more easily. Thus, the effect is enhanced to secure the compatibility of the recording in the information-recording apparatuses in which the recording linear velocity and the rising time and the falling time of the laser power are different from each other.

Further, the ratio $(Pm-Pl)/(Ph-Pl)$ may be adjusted so that the ratio $(Pm-Pl)/(Ph-Pl)$ is increased in proportion to the linear velocity. Accordingly, it is possible to establish the optimum recording power more easily.

In the method of the present invention, a pulse width of a leading pulse or a tail pulse of the multi-pulse may be adjusted in response to the third power level Pm. Owing to this adjustment, it is possible to mitigate the influence of the pulse width of the leading pulse or the tail pulse which would be otherwise caused by the unsaturation phenomenon of the laser power. In this case, the pulse width of the leading pulse or the tail pulse can be determined in proportion to Pm. Therefore, it is possible to simplify the step of optimizing the recording strategy. Consequently, the optimization of the recording power, which is performed by using the optimum strategy, can be also performed with ease.

Alternatively, a pulse width of a leading pulse or a tail pulse of the multi-pulse may be adjusted in response to a ratio Pm/Ph of the third power level Pm with respect to the first power level Ph. By doing so, it is possible to secure the compatibility of recording more easily in the information-recording apparatuses in which the recording linear velocity and the rising time and the falling time of the laser power are different from each other, as compared with the adjustment in which the pulse width of the leading pulse or the tail pulse is changed in response to Pm. In this case, the pulse width of the leading pulse or the tail pulse of the multi-pulse may be adjusted so that the pulse width is increased in proportion to the ratio Pm/Ph of the third power level Pm with respect to the first power level Ph.

Further alternatively, a pulse width of a leading pulse or a tail pulse of the multi-pulse may be adjusted in response to a ratio $(Pm-Pl)/(Ph-Pl)$ of a difference between the third power level Pm and the second power level Pl with respect to a difference between the first power level Ph and the second power level Pl. The optimum power is adjusted more easily as compared with the adjustment in which only the third power level Pm is used as a parameter. In this case, the pulse width of the leading pulse or the tail pulse of the multi-pulse may be adjusted so that the pulse width is increased in proportion to the ratio $(Pm-Pl)/(Ph-Pl)$ of the difference between the third power level Pm and the second power level Pl with respect to the difference between the first power level Ph and the second power level Pl. By doing so, it is possible to simplify the step of optimizing the recording strategy. Consequently, the optimization of the recording power, which is performed by using the optimum strategy, can be easily performed as well.

The information-recording method of the present invention may further comprise reading the linear velocity from the information-recording medium before recording the information. The recording linear velocity differs depending on the information-recording medium. When any information concerning the linear velocity is recorded on the information-recording medium, the information can be read therefrom. A plurality of Pm, Pm/Ph, Pm/Pl, and/or $(Pm-Pl)/(Ph-Pl)$, which correspond to a plurality of linear velocities, may be previously stored on the information-recording medium. Such pieces of information (management information) can be read before recording the information (user information) on the information-recording medium.

The information may be recorded with the CLV system or the CAV system. When the information is recorded with the CAV system, the selected linear velocity differs depending on a position on the information-recording medium in which the information is recorded.

According to a second aspect of the present invention, there is provided an information-recording medium for recording information by irradiating the information-recording medium with a light beam to change a state of an irradiated portion of the information-recording medium, the information-recording medium comprising:

a recording layer which causes the change of state;

a substrate which supports the recording layer; and management information which is recorded on the substrate or the recording layer, wherein:

the radiating light beam is modulated to contain a multi-pulse having at least three power levels of a first power level Ph, a second power level Pl which is lower than the first power level, and a third power level Pm which is intermediate therebetween, the multi-pulse being repeatedly modulated between the first power level Ph and the adjusted third power level Pm; and the management information includes information which relates to a linear velocity for moving the light beam relative to the information-recording medium and information which relates to the first power level Ph, the second power level Pl, and the third power level Pm adjusted in response to the linear velocity. When the information-recording medium is used, it is possible to easily perform the step of determining the optimum recording power on the basis of the information on the recording speed and Pm determined in response thereto written on the information-recording medium, irrelevant to the information-recording apparatuses in which the recording linear velocity, the rising time and the falling time of the laser power are different from each other. Further, it is possible to realize the recording compatibility between the different information-recording apparatuses.

In the information-recording medium of the present invention, the management information may include a ratio Pm/Ph between the first power level Ph and the third power level Pm. The integrated energy, which is applied when the multi-pulse is used, is determined by not only the level of Pm but also the level of Ph. Therefore, when the ratio Pm/Ph, especially the ratio Pm/Ph determined in response to the linear velocity is used, it is possible to adjust the optimum recording power more easily.

The management information may include information which represents a ratio $(Pm-Pl)/(Ph-Pl)$ of a difference between the third power level Pm and the second power level Pl with respect to a difference between the first power level Ph and the second power level Pl, especially the ratio $(Pm-Pl)/(Ph-Pl)$ which is determined in response to the linear velocity. The ratio $(Pm-Pl)/(Ph-Pl)$ represents the unsaturation state of the laser power. Therefore, when this parameter is used, it is possible to more easily secure the recording compatibility between the information-recording apparatuses in which the recording linear velocity and the rising time and the falling time of the laser power are different from each other.

The management information may include information which represents a ratio Pm/Pl between the third power level Pm and the second power level Pl, and the ratio Pm/Pl may be adjusted in response to the linear velocity. It is possible to easily perform the step of determining the optimum recording power on the basis of the information on the ratio between Pl and Pm and the linear velocity written on the information-recording medium. Further, it is possible to realize the recording compatibility between the different information-recording apparatuses.

The management information may include values of the first power level Ph, the second power level Pl, and the third power level Pm at a plurality of recording speeds respectively. When this arrangement is adopted, the appropriate power level is read from the information-recording medium in response to the recording speed, and thus the information-recording method of the present invention can be carried out. The management information may include, for example, power level Pl(2), power level Pm(2) and power level Ph(2) in the ×2 speed recording, power level Pl(3), power level Pm(3) and power level Ph(3) in the ×3 speed recording, and power level Pl(5), power level Pm(5) and power level Ph(5) in the ×5 speed recording. Here, these power levels may satisfy Pl(2)= Pm(2)<Ph(2), Pl(3)=Pm(3)<Ph(3), Pm(3)≠Pm(2), Pl(5)<Pm(5)<Ph(5).

When the power level is adjusted, a value of (Ph−Pm) at a high linear velocity may be smaller than a value of (Ph−Pm) at a low linear velocity. Further, a value of $(Pm-Pl)/(Ph-Pl)$ at a high linear velocity may be larger than a value of $(Pm-Pl)/(Ph-Pl)$ at a low linear velocity. The response characteristic of the laser can be improved, and the load on the laser can be decreased by decreasing the modulation of the pulse between the Ph level and the Pm level during the high speed recording, or by increasing the value of $(Pm-Pl)/(Ph-Pl)$ during the high speed recording to be larger than the value of $(Pm-Pl)/(Ph-Pl)$ during the low speed recording.

According to a third aspect of the present invention, there is provided a method for controlling a light power for recording information on an information-recording medium by using a light beam having at least three power levels of a first power level Ph, a second power level Pl which is lower than the first power level, and a third power level Pm which is intermediate therebetween, the method for controlling the light power comprising;

adjusting the third power level Pm in response to a linear velocity defined by the information-recording medium; and controlling the light power to generate a multi-pulse which is repeatedly modulated at least between the first power level Ph and the adjusted third power level Pm.

According to the method for controlling the light power of the present invention, the optimum third power level Pm is determined in response to the linear velocity. Therefore, it is possible to form satisfactory recording marks irrelevant to any one of the multiples of the ×1 speed. Further, when the third power level Pm is optimized, it is possible to obtain satisfactory and uniform recording characteristics even when a variety of lasers produced by different manufacturers are used.

When at least one of Pm/Pl, Pm/Ph, and a ratio $(Pm-1)/(Ph-Pl)$ is adjusted in response to the linear velocity when the third power level Pm is adjusted in response to the linear velocity determined depending on the information-recording medium, then the recording power, which is based on the use of the multi-pulse, can be optimized more easily.

DESCRIPTION OF THE PREFERRED EMBODIMENTS

A detailed explanation will be made below about results of simulation and results of experiments performed by the present inventors.

The present inventors simulated, under the following conditions, the phenomenon in which the recording pulse waveform (laser light emission waveform) is distorted as the recording linear velocity is increased and the data transfer rate is raised.

(1) The clock frequency of the pulse is proportional to the recording linear velocity and the data transfer rate. (2) The waveforms of the rising and the falling of the laser power are approximately calculated by using cosine curves. (3) The laser power is calculated in proportion to the square root of the recording linear velocity. (4) The rising time Tr and the falling time Tf of the laser power are calculated in proportion to the modulation amplitude. (5) The optimum value of the recording power is calculated so that the integrated energy of the pulse applied to the recording film is equal to the reference (integrated energy obtained when the rising time and the falling time of the laser are zero) on the basis of a case in which the rising time and the falling time of the laser power are zero. That is, in this simulation, it is assumed that the light emission waveform of the laser has a delay of response time which is approximated by a cosine curve with respect to the time. When the recording linear velocity is increased, the polarity of the light emission is reversed before the light emission power of the laser arrives at 100% or 0%. Therefore, the light emission power of the laser does not arrive at 100% or 0%, and the light emission waveform of the laser has a shape distorted with respect to the recording waveform (waveform of the laser-driving current). Further, the larger the recording laser power, i.e., the amplitude of modulation from 0% to 100% of the light emission waveform is, the larger the absolute values of the rising time and the falling time are. On the other hand, when the recording speed is increased, the laser power required for the recording is increased as well. According to this fact, this simulation makes the following assumption. That is, the more increased the recording speed is, the larger the modulation amplitude of the light emission waveform is, the more increased the rising time and the falling time of the laser are, the more increased the distortion of the light emission waveform of the laser with respect to the recording waveform is.

Figure 1:
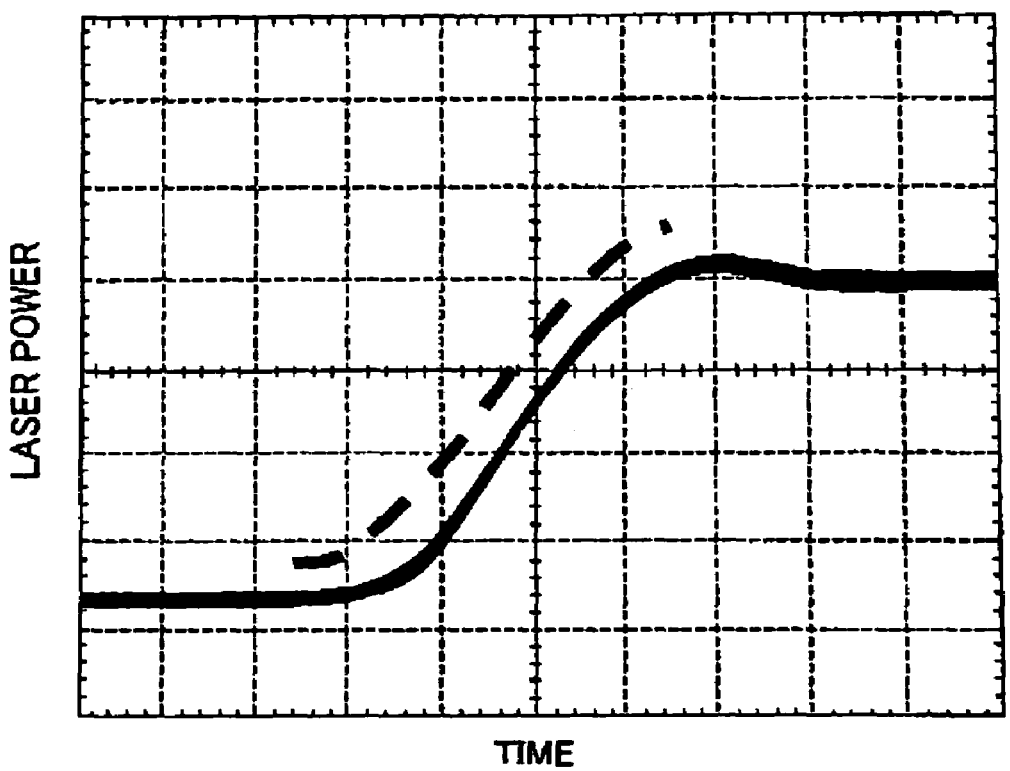
FIG. 1 schematically shows the fact that the rising time of the laser power can be calculated with a cosine curve.
Figure 2:
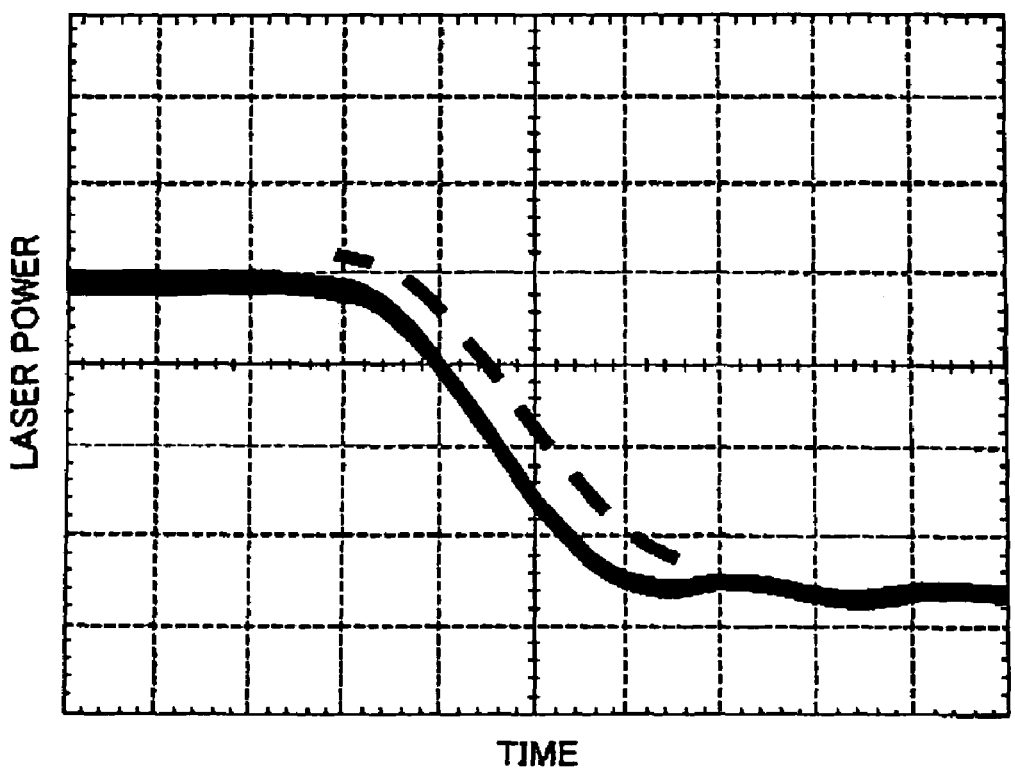
FIG. 2 schematically shows the fact that the falling time of the laser power can be calculated with a cosine curve.

FIGS. 1 and 2 show results of investigation about rising and falling responses of the laser power in relation to a laser light emission waveform used for an actual machine of the information-recording and reproducing apparatus designed for an optical recording medium. Dotted lines shown in the drawings depict those approximated by cosine curves which collate the responses of the laser light emission waveform (solid lines) of the actual machine. Therefore, it is affirmed that the approximation calculation of the rising and the falling of the laser power of this case is reasonable.

Figure 3:
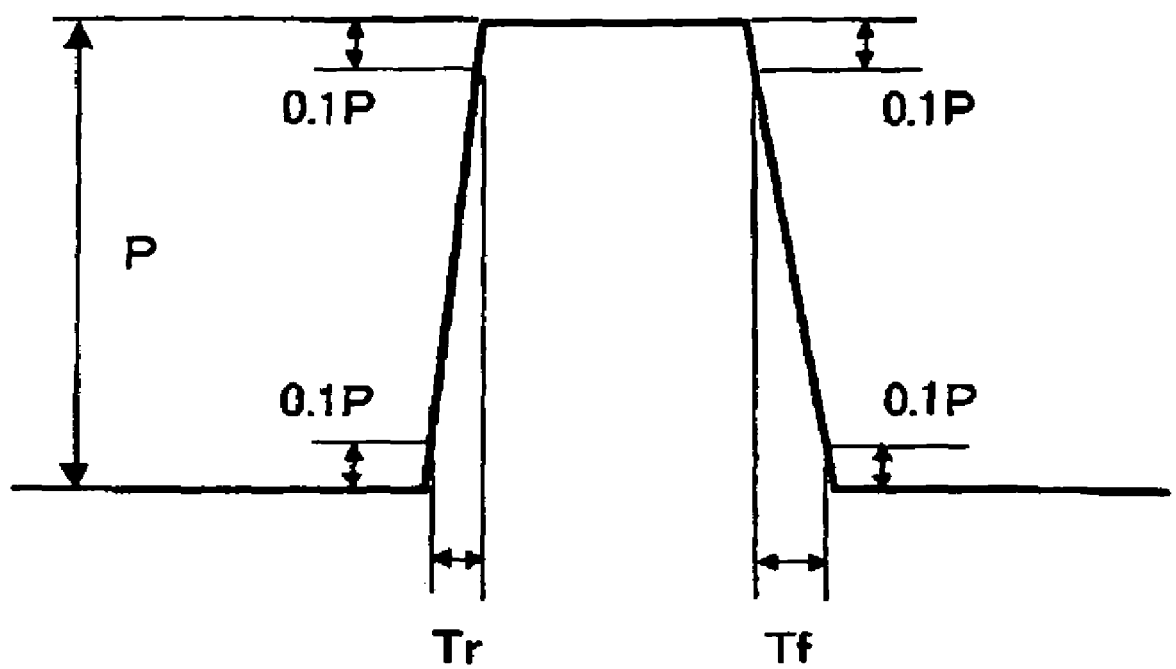
FIG. 3 schematically shows the rising time Tr and the falling time Tf of the laser power in the present invention.

FIG. 3 schematically shows a laser pulse for explaining the rising time and the falling time of the laser power. In this calculation, the rising time Tr of the laser power is the period of time required for the increase up to 90% of the peak value after arrival at 10% of the peak value of the laser power. On the other hand, the falling time Tf of the laser power is the period of time required for the decrease down to 10% of the peak value after arrival at 90% of the peak value of the laser power. It is affirmed that the laser light source is more ideal as Tr and Tf are smaller. However, Tr and Tf differ depending on manufacturers of the laser light source and the information-recording apparatus.

Figure 4:
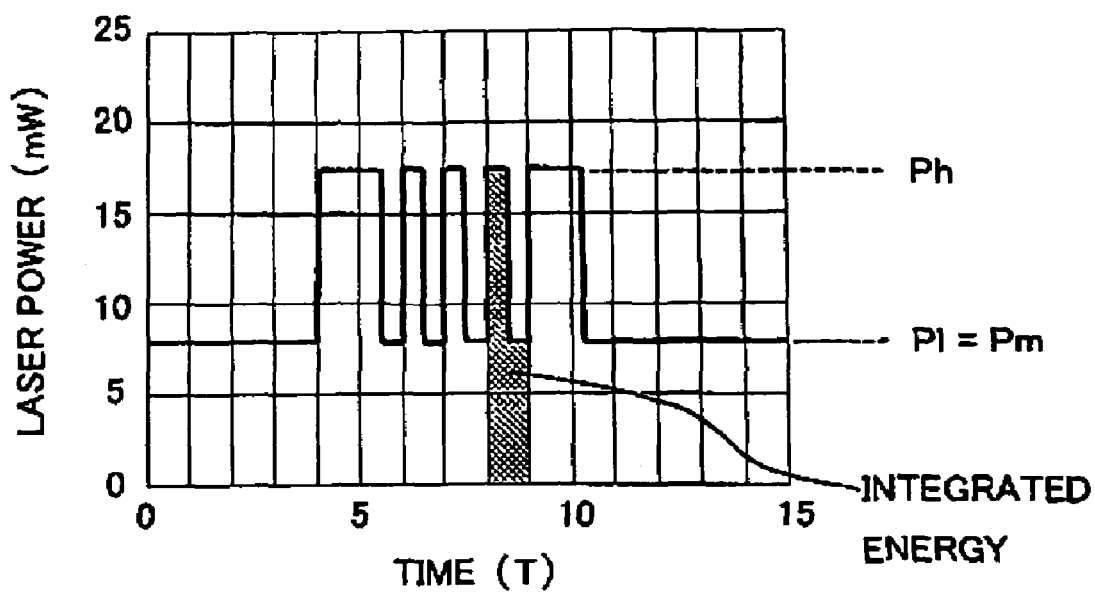
FIG. 4 shows a result of calculation for a recording pulse waveform in which the laser power is in the saturated state.

Next, an explanation will be made about results of actual calculation performed by means of simulation. In the following simulation, a recording film of a phase-change recording medium is irradiated with a laser power represented by a waveform having a multi-pulse as shown in FIG. 4. The laser power Ph indicates the amorphous level, Pl indicates the crystallization level, and Pm indicates the lower power level of the multi-pulse in the case of this simulation, it is assumed that Pl=Pm is satisfied. The reason, why the multi-pulse, in which the laser power level is repeatedly modulated to Ph and Pm, is used, is that it is intended to adjust the shape and the width (in the direction perpendicular to the track direction) of the recording mark when a relatively long mark is formed as the recording mark.

The following simulation is performed on the basis of Ph=11.0 mW and Pl=5.0 mW at a transfer rate of 22 Mbps, a linear velocity of 8.2 m/s, and a clock length of T=17.13 ns in the case of the ×2 speed recording on DVD-RAM. When the calculation is made for a case in which the recording speed is increased 5-fold and the linear velocity is 20.1 m/s, there are given a clock length of T=6.85 ns, Ph=17.4 mW, and Pl=7.9 mW. On condition that Tr=Tf=0.0 ns is given at the ×5 speed, the recording pulse waveform is as shown in FIG. 4. With reference to FIG. 4, the integrated energy applied to the recording film is calculated from the area of the shaded portion. That is, the integrated energy is determined by the power levels Ph and Pm and the radiation times of the light beam radiated at these power levels. As the linear velocity is increased, the radiation time is shortened. Therefore, it is necessary to make control so that the laser powers Ph and Pm are increased.

The present inventors assume that the length of the multi-pulse portion disposed between the leading pulse and the tail pulse or the trailing pulse is the shortest in the pulse waveform, which is most greatly affected by the delay of the laser light emission. Accordingly, in this simulation, the integrated energy applied to the recording film by the laser light emission is calculated for an amount corresponding to 1 cycle of the multi-pulse brought about between the leading pulse and the tail pulse.

Figure 5:
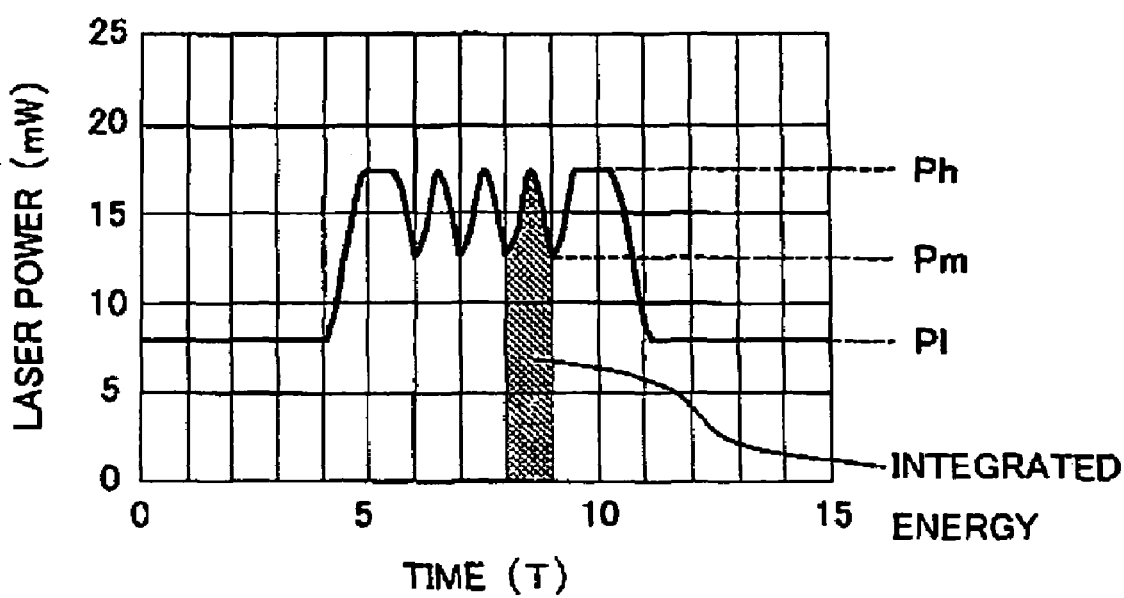
FIG. 5 shows a result of calculation for a recording pulse waveform in which the laser power is in the unsaturated state.

Subsequently, when the calculation is made for a case in which Tr=Tf=3 ns is given at the ×5 speed, the recording pulse waveform is as shown in FIG. 5. As understood from FIG. 5, when the recording linear velocity is increased and the clock length is shortened, then the falling of the pulse, which must fall down to the Pl level in principle, arrives at only the Pm level due to the unsaturation of the laser power. As a result, the integrated energy of the pulse applied to the recording film, which is calculated by the area of the shaded portion shown in FIG. 5, is relatively larger than that obtained in FIG. 4. Any obtained mark is different from the mark recorded with the recording pulse waveform shown in FIG. 4. The present inventors have found out the following fact. That is, in order to perform the recording to obtain the same mark as the mark to be formed by the light beam having the recording pulse waveform shown in FIG. 4, it is necessary that the Ph level for the recording is set to be somewhat low beforehand while considering the unsaturation of the laser power so that the integrated energy is conformed.

Figure 6:
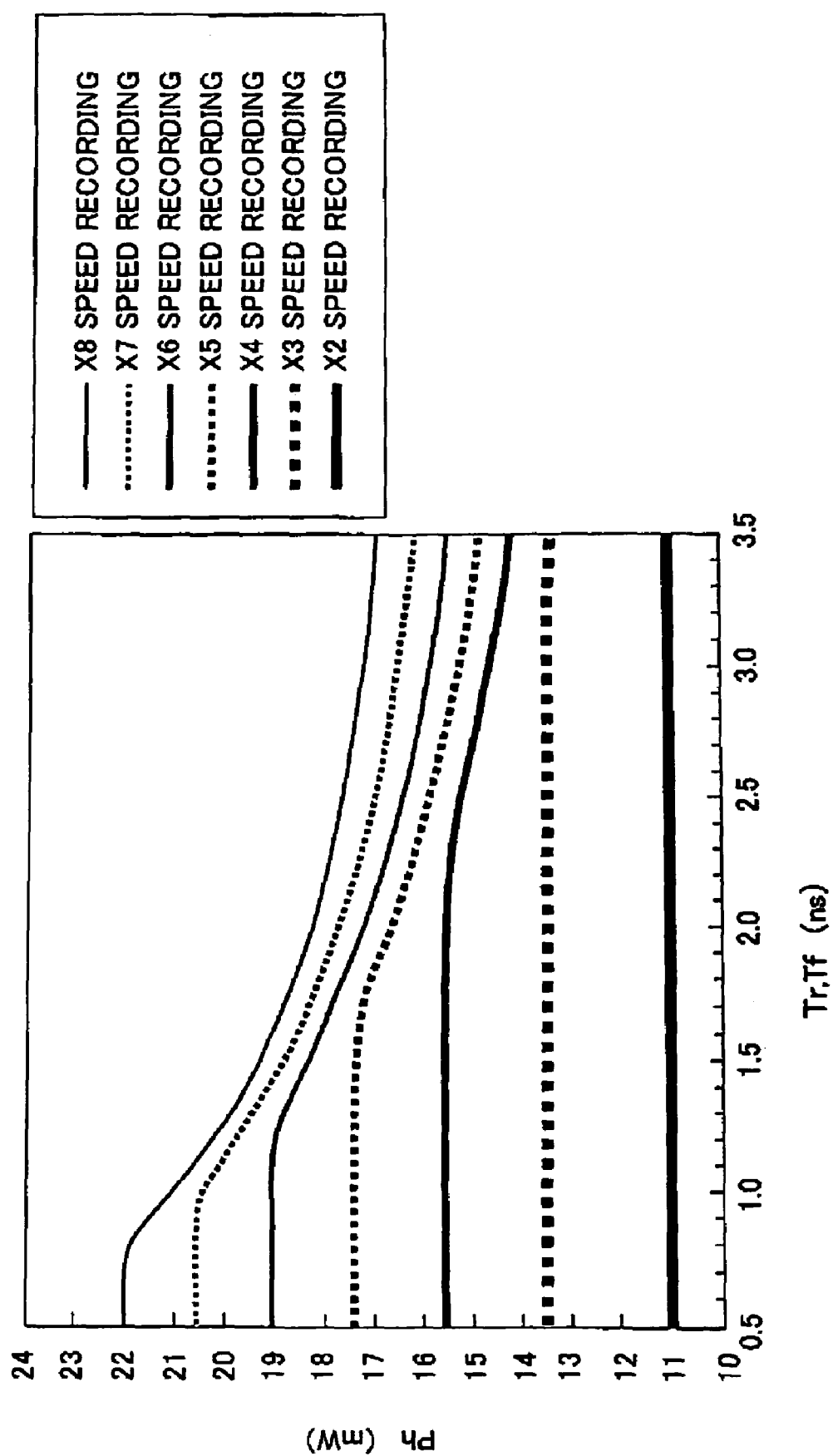
FIG. 6 shows the change of Ph depending on Tr, Tf and the recording speed on account of the unsaturation phenomenon of the laser power assuming that the vertical axis represents the power level Ph and the horizontal axis represents the rising time Tr and the falling time Tf of the laser power.

FIG. 6 shows results of the determination, by means of the simulation while considering the unsaturation of the laser power as described above, of the values of Ph at each of which the integrated energy of the pulse of the laser power is equal to that obtained when Tr (=Tf) is 0.0 ns, when Tr (=Tf) is varied from 0.5 ns to 3.5 ns in the recording at the ×2, ×3, ×4, ×5, ×6, ×7, and ×8 speeds. As appreciated from the results of simulation shown in FIG. 6, the recording can be performed at an identical power level of Ph within a range of Tr (=Tf) from 0.5 ns to 3.5 ns in the ×2 speed recording. That is, the laser is capable of performing the recording at the identical high power level Ph irrelevant to the response characteristic of the laser as long as the ×2 speed recording is performed. However, in the ×5 speed recording, if Tr (=Tf) is larger than 1.5 ns, the unsaturation phenomenon of the laser power occurs. Therefore, in order to perform the recording with the same integrated energy as that obtained when Tr (=Tf) is 0.0 ns, it is necessary that the recording is performed at a laser power lower than that used when Tr (=Tf) is 0.0 ns. In the case of the ×8 speed recording, no saturation is caused even when Tr (=Tf) is 0.0 ns. The laser power level Ph also differs between when Tr (=Tf) is 1.0 ns and when Tr (=Tf) is 2.5 ns. That is, in the case of the ×8 speed recording, the optimum power level Ph is different from the power level of the ideal response of the laser (Tr (=Tf)=1.0 ns) even when the response characteristic of the laser is relatively satisfactory (Tr (=Tf)=1.0 ns). This is because the power level Pm cannot be decreased as low as the power level Pl due to the unsaturation phenomenon of the laser, and it is necessary to relatively decrease the power level of Ph in order to perform the recording with an integrated energy which is same as the ideal integrated energy when the ideal response of the laser is performed. It is understood from FIG. 6 that this phenomenon becomes conspicuous as the linear velocity is more increased and as the response characteristic of the laser (Tr, Tf) is more deteriorated. Further, according to FIG. 6, the recording can be performed at the power level Ph which is same as the power level Ph of the ideal response characteristic of the laser (Tr (=Tf)=1.0 ns) within a range of the ×2 speed to the ×8 speed of the recording linear velocity only when the response characteristic of the laser is extremely satisfactory (Tr (=Tf)≦0.8 ns).

As described above, the optimum laser power level Ph differs when the rising time and the falling time of the laser power differ due to the unsaturation phenomenon of the laser power. Further, the faster the recording linear velocity is, the more conspicuous this tendency is. This causes a serious problem when it is intended to establish the recording compatibility between the recording media and the recording apparatuses in which the rising time and the falling time of the laser power and the recording linear velocity are different from each other.

Figure 7:
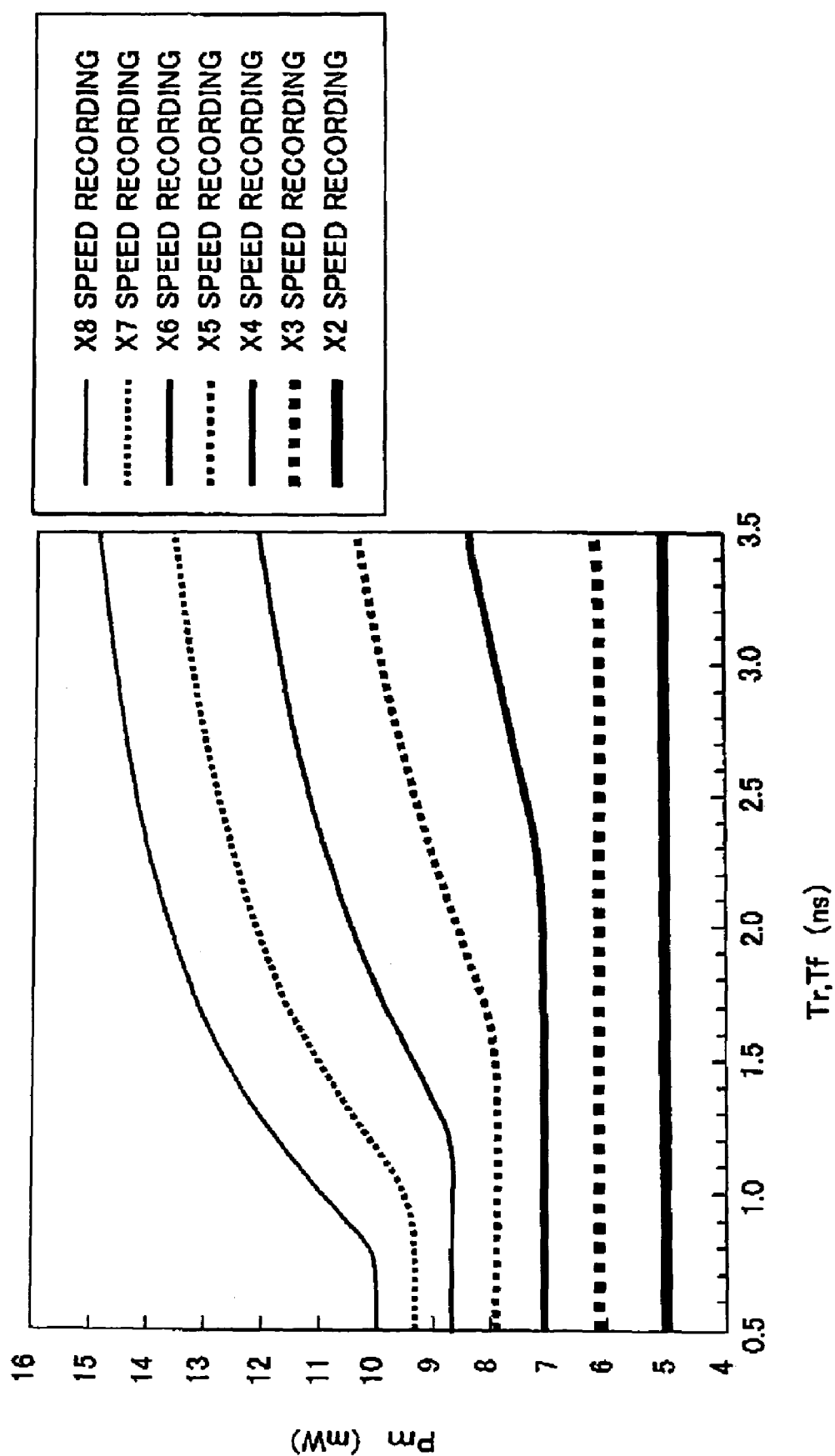
FIG. 7 shows the change of Pm depending on Tr, Tf and the recording speed on account of the unsaturation phenomenon of the laser power assuming that the vertical axis represents the power level Pm and the horizontal axis represents the rising time Tr and the falling time Tf of the laser power.

FIG. 7 shows results of the determination, by means of the simulation, of the values of Pm at the values of Ph at each of which the integrated energy is equal to that obtained when Tr (=Tf) is 0.0 ns while considering the unsaturation of the laser power as described above, when Tr (=Tf) is varied from 0.5 ns to 3.5 ns in the recording at the ×2, ×3, ×4, ×5, ×6, ×7, and ×8 speeds. Further, the value of Pm, which was used to set the value of Ph, is the lowest value of Pm in the case that the value of Pm was different from the value of Pl due to the delay of the response of the laser (Tr>0). The recording can be performed at a power level of Pm=Pl within a range of Tr (=Tf) from 0.5 ns to 3.5 ns in the ×2 speed recording, because the unsaturation phenomenon of the laser power is not caused. However, when the recording speed is increased, the unsaturation phenomenon of the laser power occurs. Therefore, for example, in the case of the ×8 speed recording, the value of the laser power Pm differs between when Tr (=Tf) is 1.0 ns and when Tr (=Tf) is 2.5 ns. It is considered that this situation is caused because the phenomenon that the power level Pm cannot be decreased as low as the power level Pl occurs more conspicuously at Tr=2.5 ns than Tr=1.0 ns.

As described above, the optimum laser power level Ph as well as the optimum laser power level Pm differs when the rising time and the falling time of the laser power differ due to the unsaturation phenomenon or the laser power. Further, the faster the recording linear velocity is, the more conspicuous this tendency is. This causes a serious problem when it is intended to establish the recording compatibility between the recording media and the recording apparatuses in which the rising time and the falling time of the laser power and the recording linear velocity are different from each other.

Figure 8:
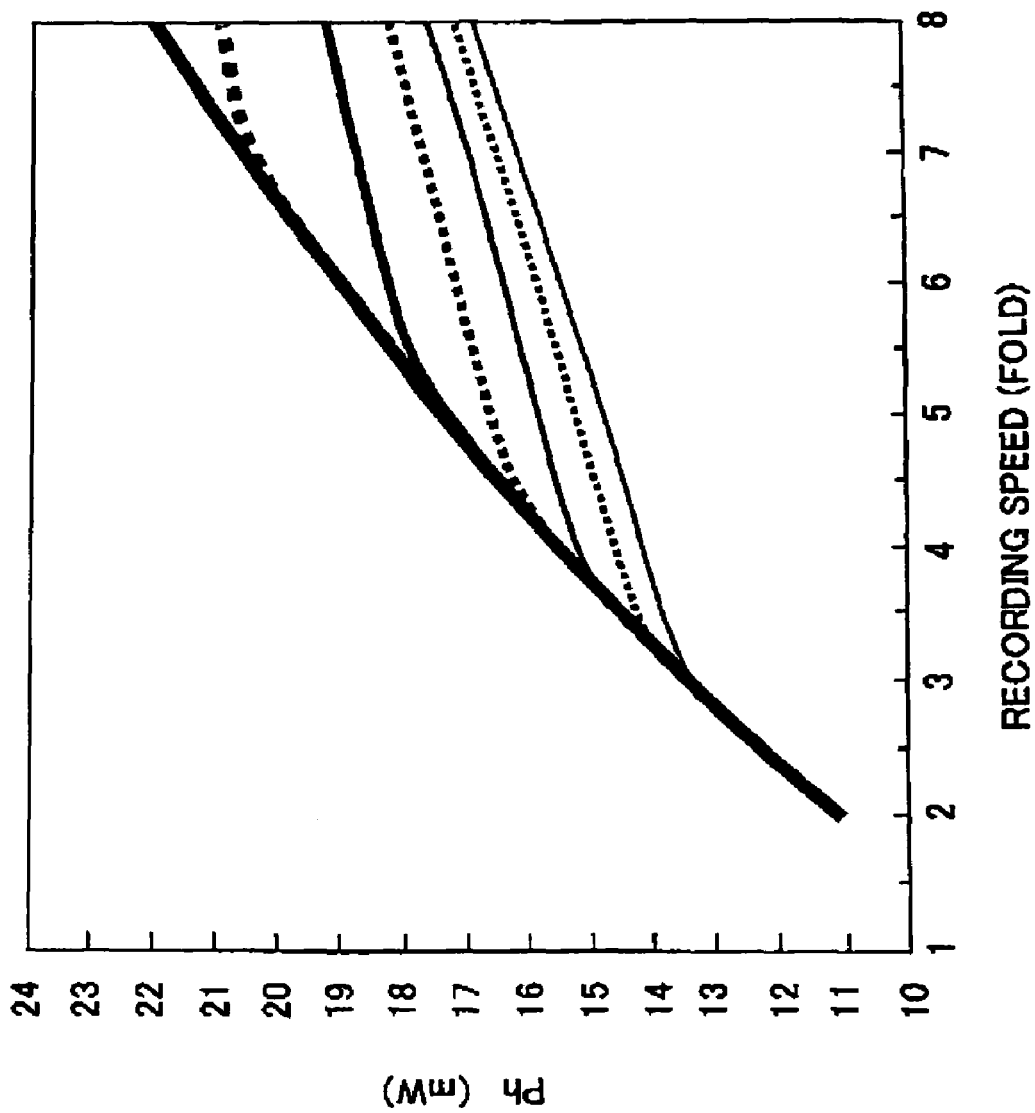
FIG. 8 shows the change of Ph depending on the recording speed and the rising time Tr and the falling time Tf of the laser power on account of the unsaturation phenomenon of the laser power assuming that the vertical axis represents the power level Ph and the horizontal axis represents the recording speed.
Figure 9:
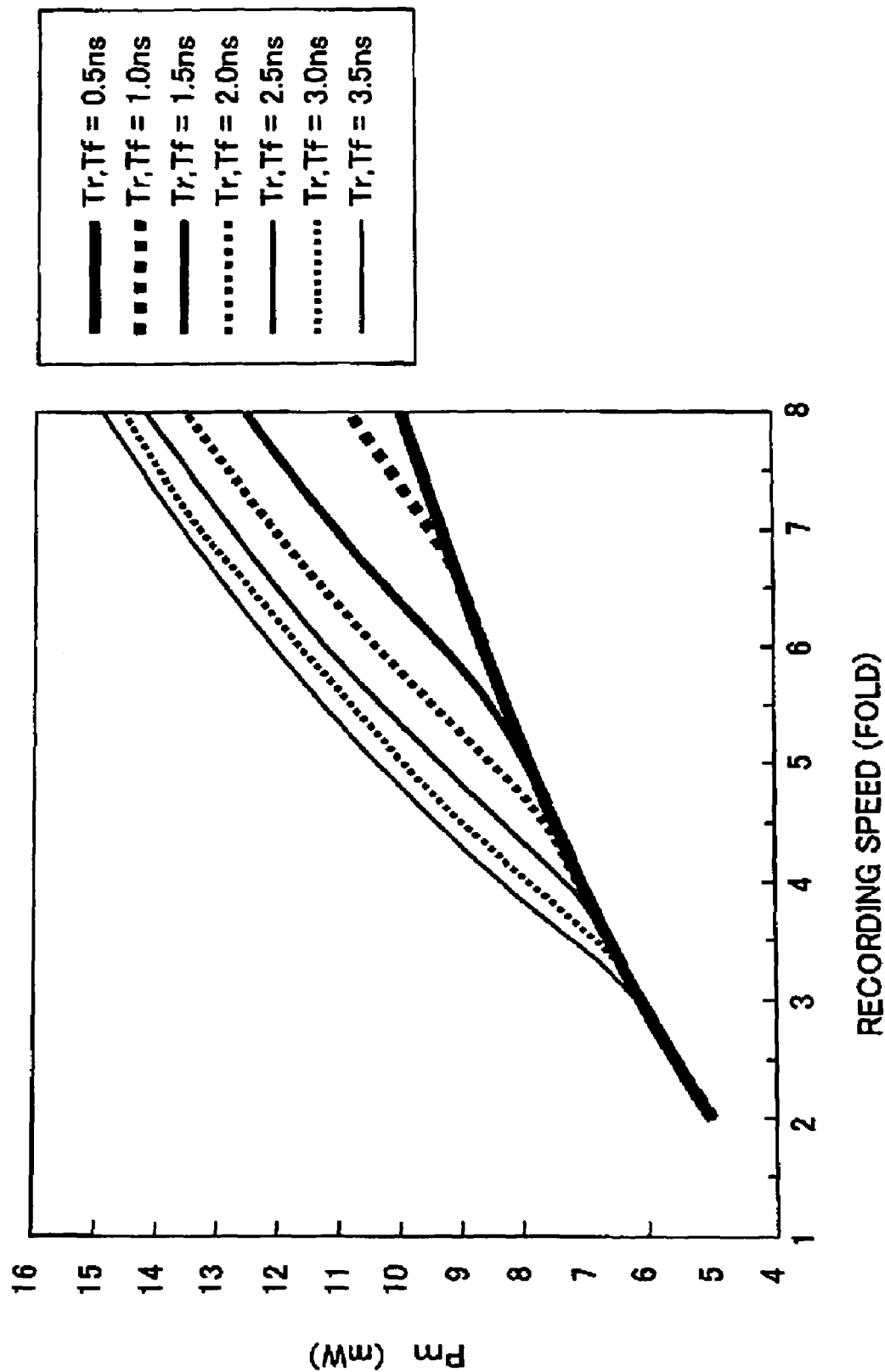
FIG. 9 shows the change of Pm depending on the recording speed and the rising time Tr and the falling time Tf of the laser power on account of the unsaturation phenomenon of the laser power assuming that the vertical axis represents the power level Pm and the horizontal axis represents the recording speed.

FIGS. 8 and 9 show results in which the recording speed is newly plotted on the horizontal axis for those shown in FIGS. 6 and 7. The recording speed is represented by multiples of the ×1 speed (data transfer rate: 11 Mbps, linear velocity: 4.1 m/sec). As shown in FIGS. 8 and 9, the laser power levels Ph and Pm change nonlinearly with respect to the recording speed even when the rising time and the falling time of the laser are identical. This tendency is conspicuous as the rising time and the falling time of the laser are increased. The laser powers Ph and Pm are changed nonlinearly with respect to the recording speed as described above, and hence it is necessary that the three powers, i.e., Ph, Pl, and Pm are changed respectively individually for every recording linear velocity so that the error rate is minimized when the optimum recording laser power is determined for the information-recording apparatus in which the recording linear velocity differs, resulting in any complicated procedure for the trial writing with the laser power. This causes a serious problem.

The present inventors propose the following method for solving the problems, i.e., the complicated step of determining the optimum laser power levels Ph, Pl, and Pm as well as the difficulty of establishment of the recording compatibility between recording apparatuses and recording media when the rising time and the falling time of the laser power and the linear velocity during the recording are different from each other due to the unsaturation phenomenon of the laser power as described above.

Figure 10:
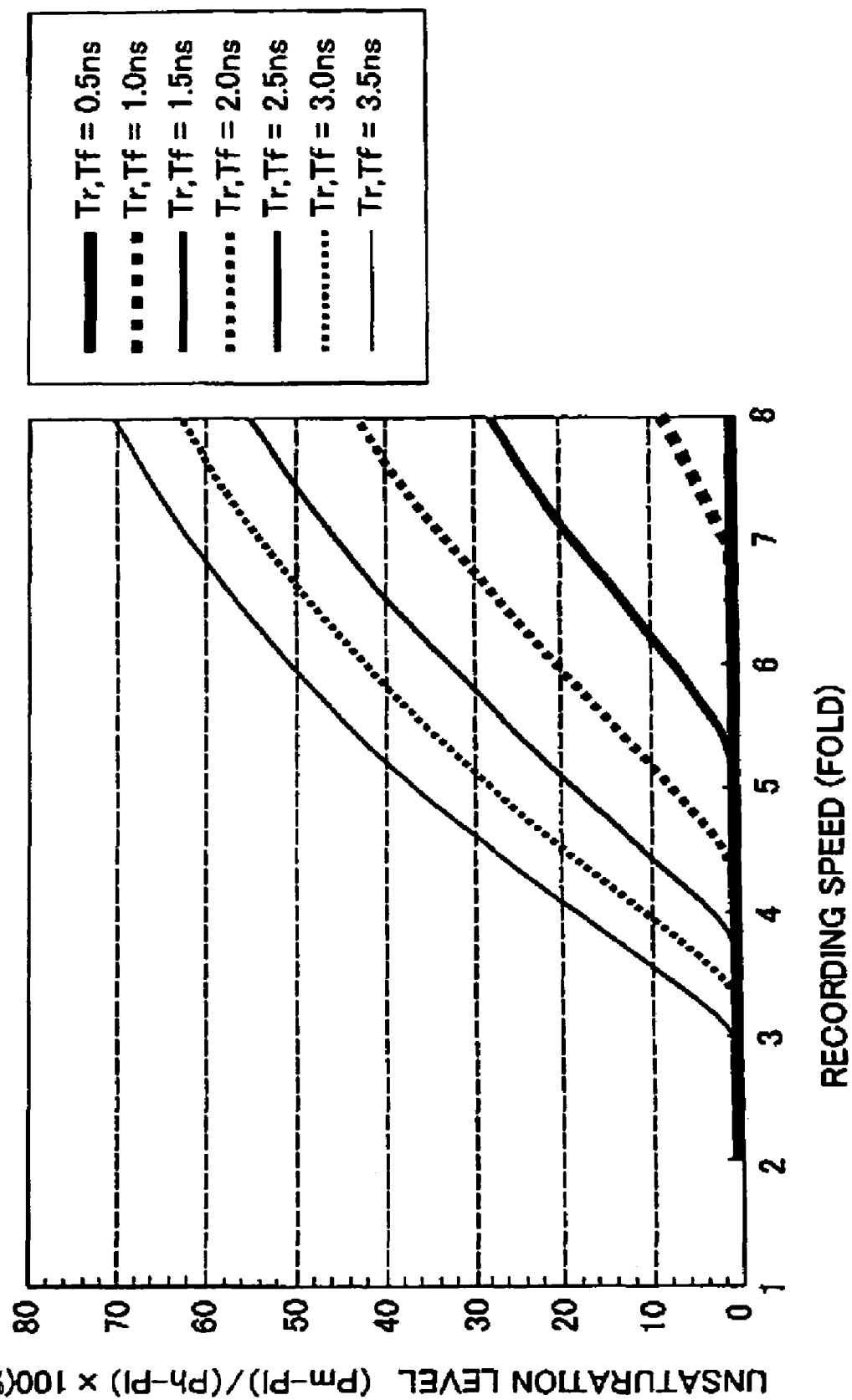
FIG. 10 shows the nonlinear change of the relationship between the unsaturation level [(Pm−Pl)/(Ph−Pl)] of the laser power and the recording speed depending on the rising time Tr and the falling time Tf of the laser power on account of the unsaturation phenomenon of the laser power.

A factor [(Pm−Pl)/(Ph−Pl)] is assumed to represent the unsaturation of the laser level. Ideally, Pm=Pl is given, in which no unsaturation occurs as shown in FIG. 4. However, when the unsaturation occurs, Pl<Pm is given as shown in FIG. 5. Therefore, the degree of unsaturation can be represented by (Pm−Pl)/(Ph−Pl). When no unsaturation occurs, (Pm−Pl)/(Ph−Pl)=0 is given, because Pm=Pl is satisfied. FIG. 10 shows results of the summarized way of the change of the unsaturation level when Tr (=Tf) is from 0.5 ns to 3.5 ns assuming that the horizontal axis represents the recording speed and the vertical axis represents [(Pm−Pl)/(Ph−Pl)]×100 for the results shown in FIGS. 6 and 7 described above. When Tr (=Tf) is 0.5 ns, the unsaturation phenomenon of the laser power is not caused during the recording at the ×2 speed to the ×8 speed. Therefore, the unsaturation level [(Pm−Pl)/(Ph−Pl)]×100 is 0%. However, when Tr (=Tf) is from 1.0 ns to 3.5 ns, the unsaturation level is nonlinearly changed. If this situation is left as it is, it is impossible to easily determine the unsaturation level, the power levels Ph and Pm at the respective Tr's (=Tf's) and the recording speeds. In particular, with reference to FIG. 10, it is clear that the unsaturation level differs depending on the recording speed (linear velocity) and the response characteristic (Tr, Tf) of the laser, suggesting that it is necessary to adjust the power levels Ph and Pm for each of the information-recording apparatuses which carry different lasers.

Figure 11:
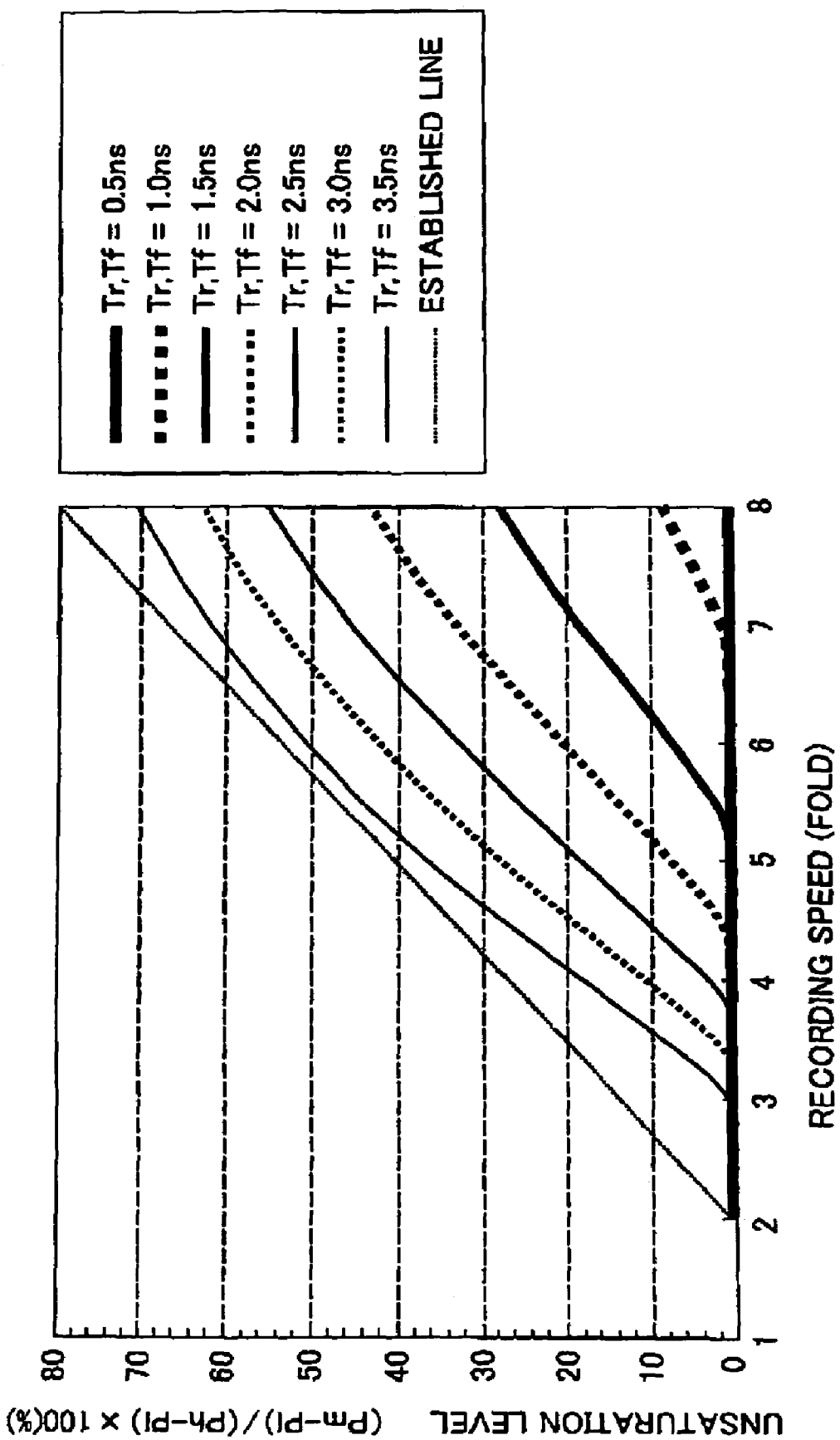
FIG. 11 shows the setting to provide the linear relationship by changing [(Pm−Pl)/(Ph−Pl)] depending on the recording speed so that the relationship between the unsaturation level [(Pm−Pl)/(Ph−Pl)] of the laser power and the recording speed as shown in FIG. 10 is not affected by the unsaturation phenomenon of the laser power.

However, as indicated by a thick line shown in FIG. 11, the relationship between [(Pm−Pl)/(Ph−Pl)] and the recording speed may be set beforehand so that the relationship is conveniently linear so as to exceed the unsaturation level to be generated. By doing so, the recording speed may be determined without being affected by the unsaturation phenomenon caused by the rising time and the falling time of the laser power. Accordingly, it is possible to determine the power levels Ph and Pm by using the value of [(Pm−Pl)/(Ph−Pl)].

Figure 20A:
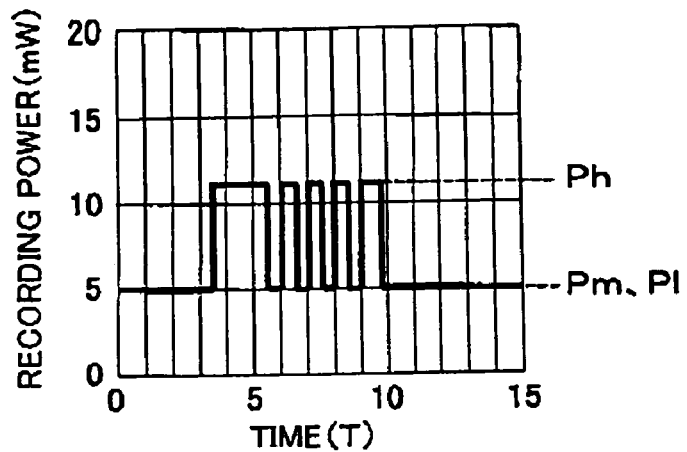
FIGS. 20A to 20C explain waveforms of recording pulses to be used for the information-recording method according to the present invention.
Figure 20B:
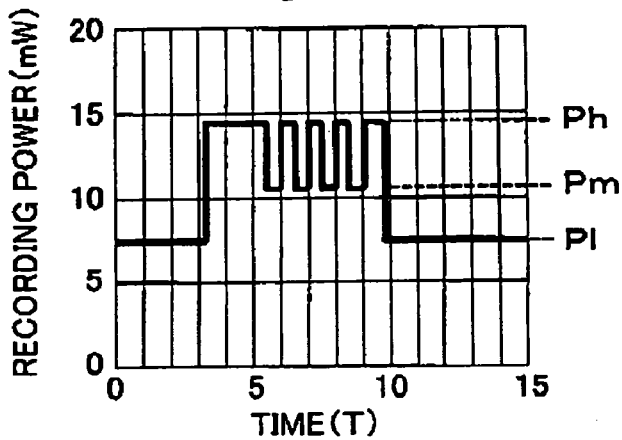
Figure 20C:
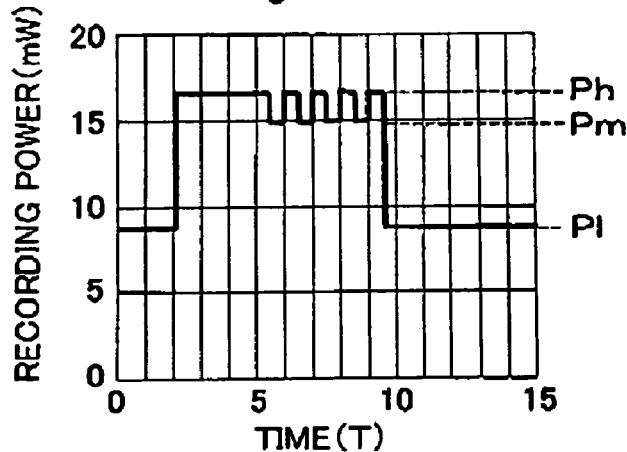

Assuming that the relationship between [(Pm−Pl)/(Ph−Pl)] and the recording speed is represented by the thick line shown in FIG. 11, there is given [(Pm−Pl)/(Ph−Pl)]=(recording speed)×(80/6)−(80/3) (%). In this case, the recording speed is represented by the multiples with respect to the ×1 speed. This setting means the fact that the adjustment is made to increase the value of Pm (or Pm/Ph) in response to the recording speed as shown in FIGS. 20A to 20C in order to obtain the satisfactory response characteristic of the laser. This fact may be also interpreted as follows. That is, the response characteristic of the laser is improved, because the load of the output fluctuation of the laser is mitigated when the difference between Pm and Ph is decreased.

Figure 12:
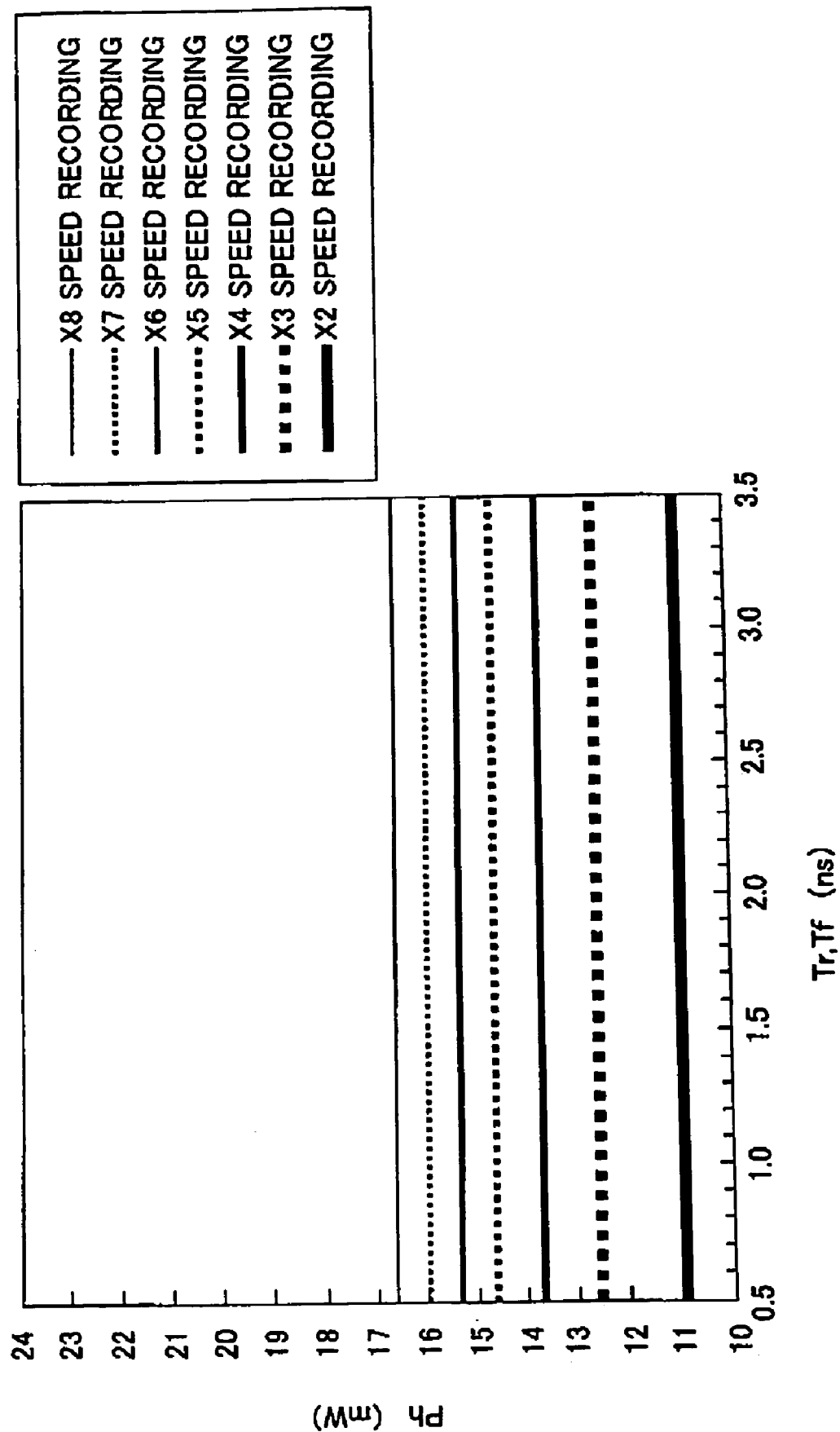
FIG. 12 shows the disappearance of the change of the power level Ph depending on the rising time Tr and the falling time Tf of the laser power as a result of the provision of the relationship of the setting as shown in FIG. 11 between the unsaturation level [(Pm−Pl)/(Ph−Pl)] of the laser power and the recording speed.
Figure 13:
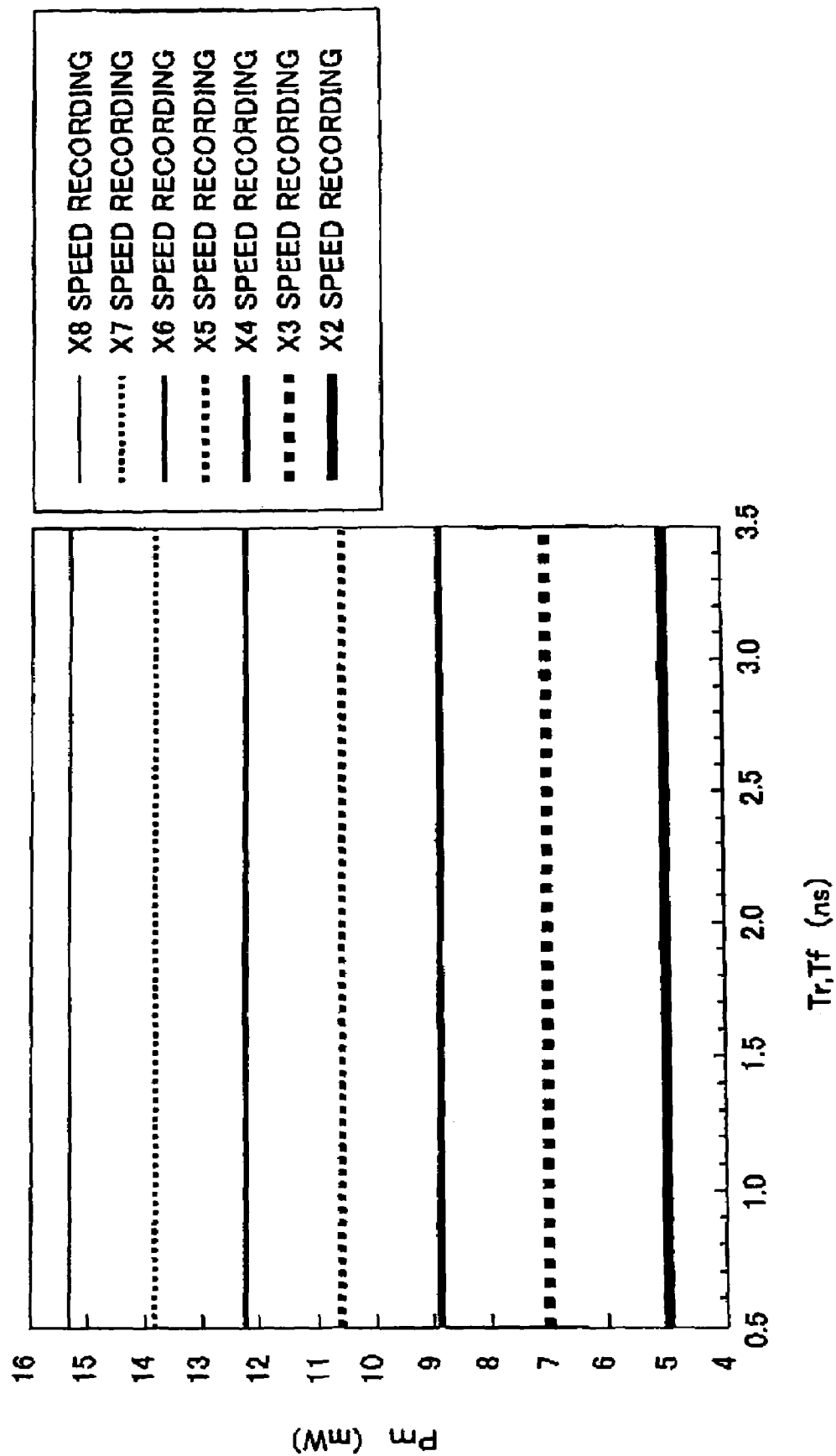
FIG. 13 shows the disappearance of the change of the power level Pm depending on the rising time Tr and the falling time Tf of the laser power as a result of the provision of the relationship of the setting as shown in FIG. 11 between the unsaturation level [(Pm−Pl)/(Ph−Pl)] of the laser power and the recording speed.

FIGS. 12 and 13 show values of Ph and values of Pm determined so that the integrated energy is equal to that obtained when Tr (=Tf) is 0.0 ns, when Tr (=Tf) is changed from 0.5 ns to 3.5 ns in the recording at the ×2, ×3, ×4, ×5, ×6, ×7, and ×8 speeds by using the relational expression between [(Pm−Pl)/(Ph−Pl)] and the recording speed described above.

The following fact is appreciated when FIG. 12 is compared with FIG. 6. That is, no variation arises in the power level Ph, which would be otherwise caused depending on Tr, Tf at the respective recording speeds when the certain relational expression is established between [(Pm−Pl)/(Ph−Pl)] and the recording speed so that the unsaturation level shown in FIG. 11 is exceeded as compared with the case in which the situation is affected by the unsaturation of the laser power as shown in FIG. 6.

Further, the following fact is appreciated when FIG. 13 is compared with FIG. 7. That is, no variation arises in the power level Pm, which would be otherwise caused depending on Tr, Tf at the respective recording speeds when the certain relational expression is established between [(Pm−Pl)/(Ph−Pl)] and the recording speed so that the unsaturation level shown in FIG. 11 is exceeded as compared with the case in which the situation is affected by the unsaturation of the laser power as shown in FIG. 7.

According to the results shown in FIGS. 12 and 13, the following fact is appreciated. That is, it is possible to bring about the recording compatibility between the information-recording apparatuses by establishing the certain relational expression between [(Pm−Pl)/(Ph−Pl)] and the recording speed, even when the rising time and the falling time of the laser power and the linear velocity during the recording differ, because the recording laser power levels Ph and Pm are constant on the basis of the linear velocity during the recording even when the rising time and the falling time of the laser power are different from each other.

Figure 14:
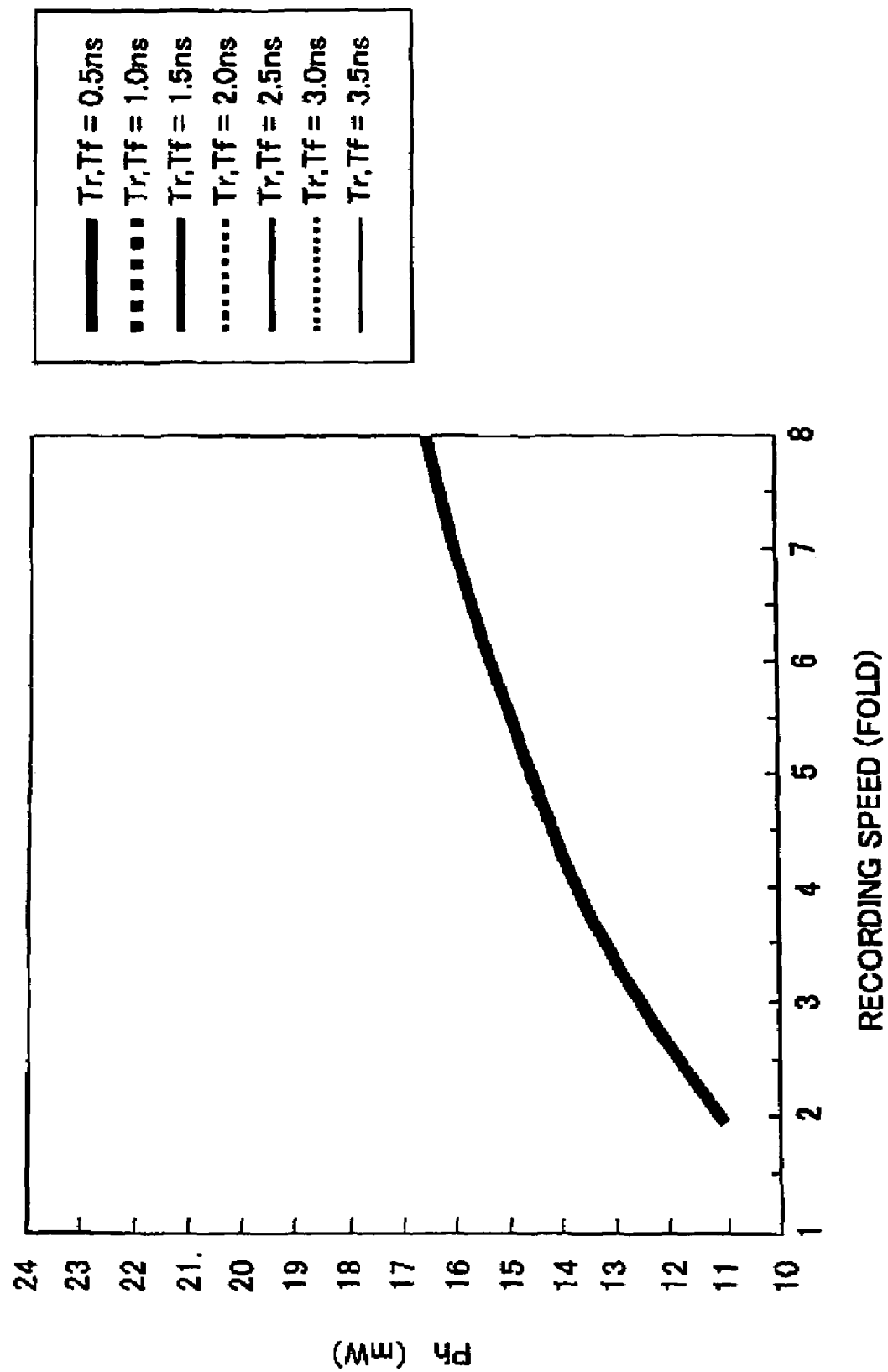
FIG. 14 shows the power level Ph which does not depend on the rising time Tr and the falling time Tf of the laser power and which is definitely determinable by the recording speed as a result of the provision of the relationship of the setting as shown in FIG. 11 between the unsaturation level [(Pm−Pl)/(Ph−Pl)] of the laser power and the recording speed.
Figure 15:
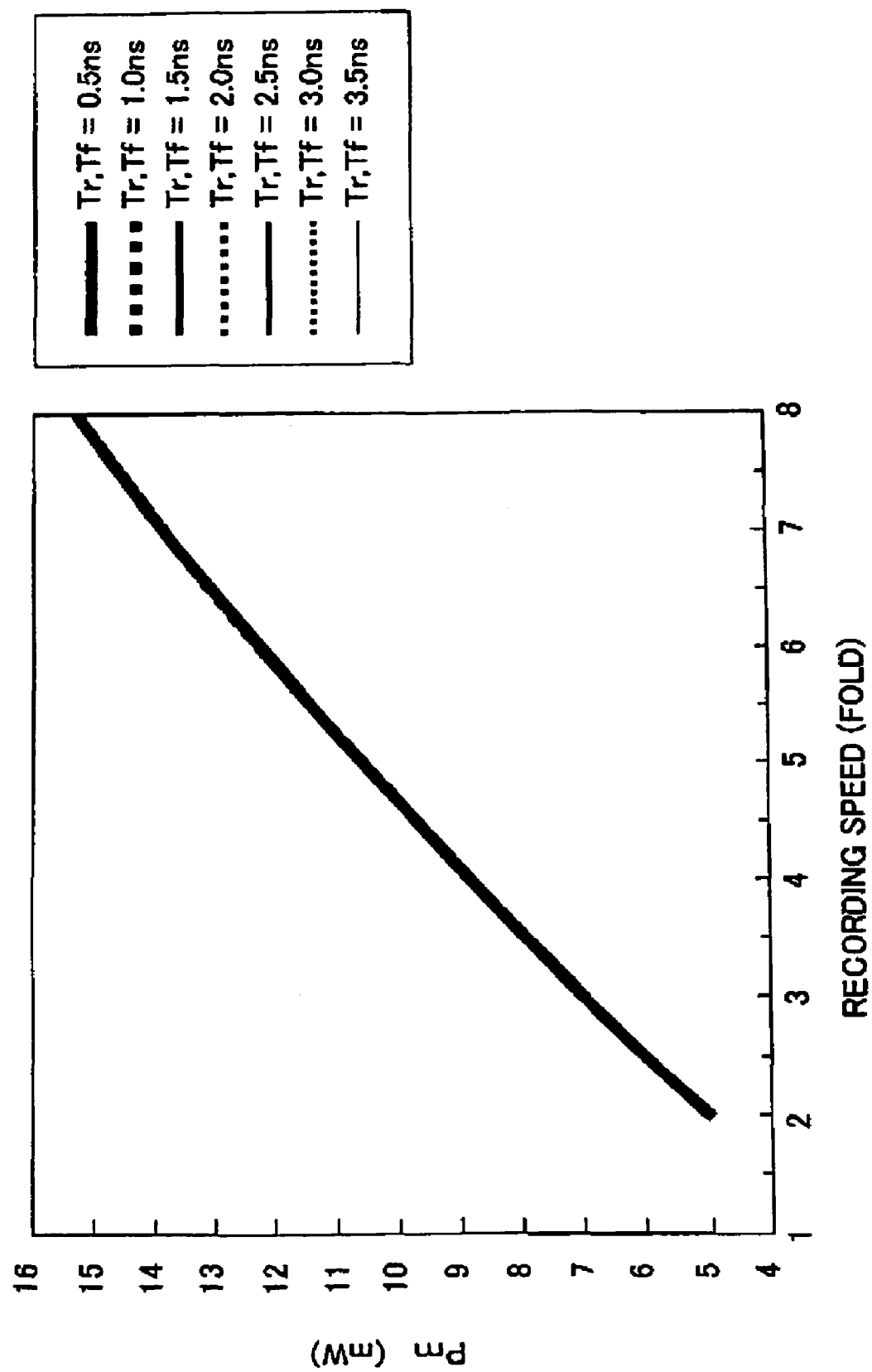
FIG. 15 shows the power level Pm which does not depend on the rising time Tr and the falling time Tf of the laser power and which is definitely determinable by the recording speed as a result of the provision of the relationship of the setting as shown in FIG. 11 between the unsaturation level [(Pm−Pl)/(Ph−Pl)] of the laser power and the recording speed.

FIGS. 14 and 15 show results in which the recording speed is newly plotted on the horizontal axis for those shown in FIGS. 12 and 13. The recording speed is represented by multiples of the ×1 speed.

The following fact is appreciated when FIG. 14 is compared with FIG. 8. That is, the laser power Ph can be definitely determined from the recording speed without depending on the rising time and the falling time of the laser when the certain relational expression is established between [(Pm−Pl)/(Ph−Pl)] and the recording speed so that the unsaturation level shown in FIG. 14 is exceeded as compared with the case in which the situation is affected by the unsaturation of the laser power as shown in FIG. 8.

The following fact is appreciated when FIG. 15 is compared with FIG. 9. That is, the laser power Pm can be definitely determined from the recording speed without depending on the rising time and the falling time of the laser when the certain relational expression is established between [(Pm−Pl)/(Ph−Pl)] and the recording speed so that the unsaturation level shown in FIG. 15 is exceeded as compared with the case in which the situation is affected by the unsaturation of the laser power as shown in FIG. 9.

According to the results shown in FIGS. 14 and 15, the following fact is appreciated. That is, it is possible to definitely determine the optimum recording powers of Ph and Pm from the recording linear velocity by previously establishing the certain relational expression between [(Pm−Pl)/(Ph−Pl)] and the recording linear velocity even when the rising time and the falling time of the laser power and the linear velocity during the recording differ, because the recording laser power levels Ph and Pm can be definitely determined on the basis of the linear velocity during the recording even when the rising time and the falling time of the laser power differ.

As described above, when the certain relationship is established between [(Pm−Pl)/(Ph−Pl)] and the recording linear velocity so as to exceed the unsaturation level generated within the ranges of the use of the rising time and the falling time of the laser power and the recording linear velocity, the laser power Pm can be derived from the certain relationship based on the recording linear velocity without considering the unsaturation phenomenon of the laser which would be otherwise caused by the rising time and the falling time of the laser power. In other words, the value of Pm can be determined by means of the calculation by determining the laser powers Ph and Pl. Accordingly, in spite of the fact that the three values of Ph, Pl, and Pm must be separately determined in principle as the optimum recording powers, the value of Pm is spontaneously determined when Ph and Pl are determined. Thus, it is easy to perform the step of determining the optimum recording laser power.

When this method is used for the recording apparatus or when this method is recorded beforehand as information (management information) on the recording medium, then it is easy to perform the step of determining the optimum recording power, and it is also possible to secure the compatibility of the recording between the apparatuses in which the rising time and the falling time of the laser beam are different from each other.

Figure 16:
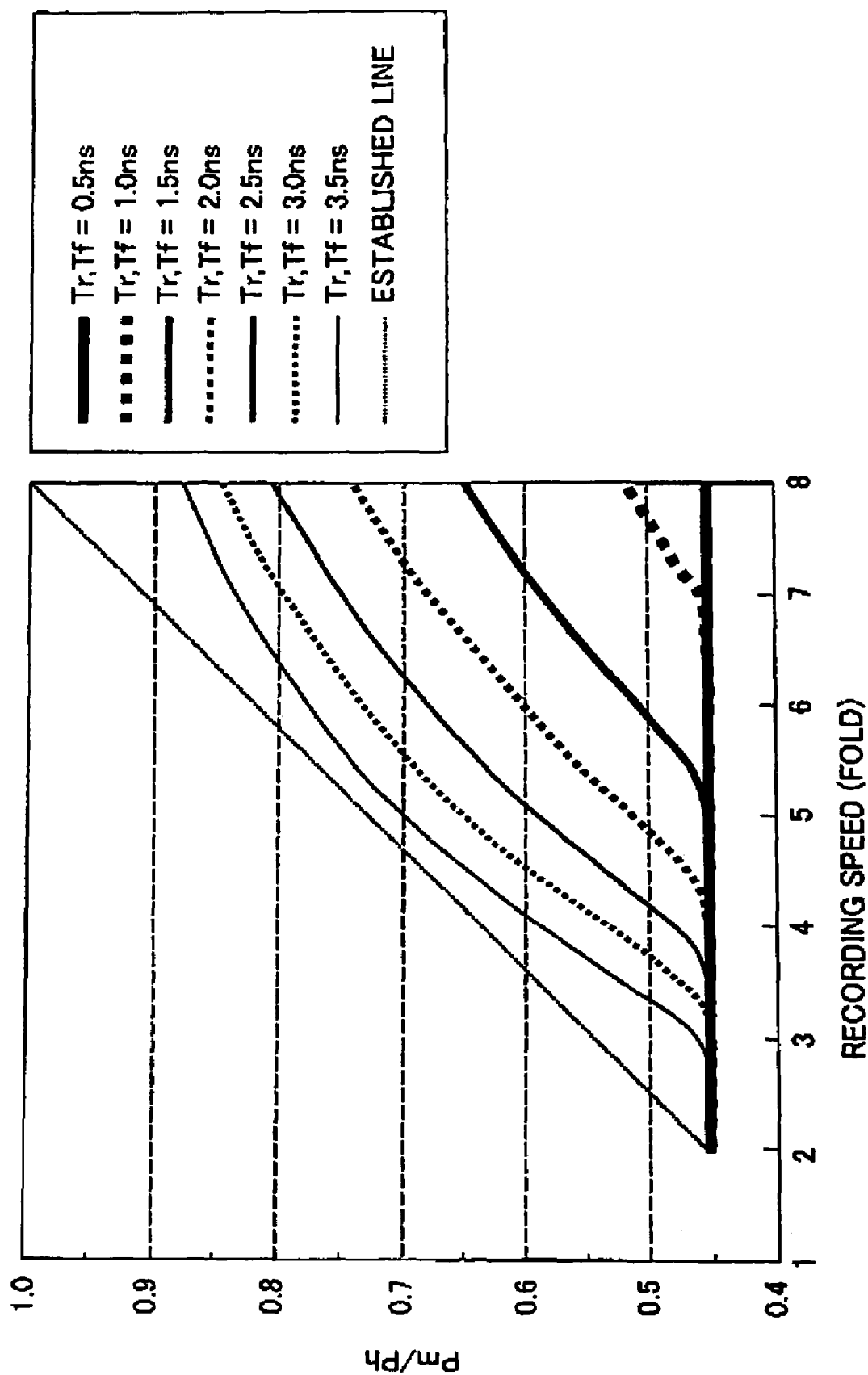
FIG. 16 shows a case of the setting to provide the linear relationship by changing Pm/Ph depending on the recording speed so that the relationship between Pm/Ph and the recording speed is not affected by the unsaturation phenomenon of the laser power by substituting the vertical axis shown in FIG. 11 with the ratio Pm/Ph of the laser power level.

Similarly, FIG. 16 shows results of the summarized way of the change of the unsaturation level when Tr (=Tf) is from 0.5 ns to 3.5 ns assuming that the horizontal axis represents the recording speed and the vertical axis represents Pm/Ph for the results shown in FIGS. 5 and 6 described above. In the same manner as in the case shown in FIG. 11, when the relationship between Pm/Ph and the recording speed is linearly approximated in a convenient manner beforehand so that the unsaturation level to be generated is exceeded as shown by a thick line shown in FIG. 16, it is also possible to determine the value of Pm by using the value of Ph from the value of Pm/Ph by determining the recording speed without being affected by the unsaturation phenomenon which would be otherwise caused by the rising time and the falling time of the laser power.

Figure 17:
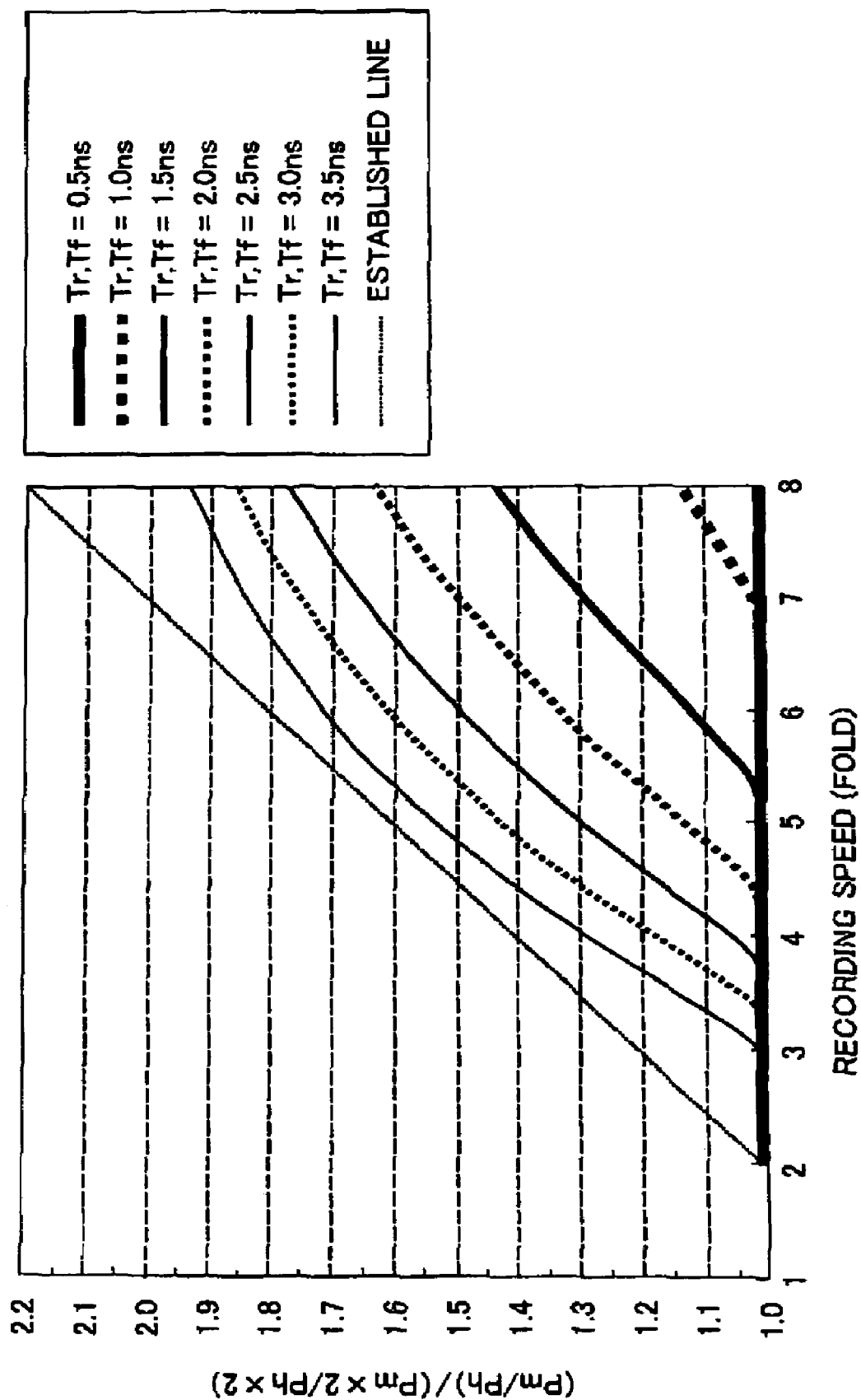
FIG. 17 shows a case of the setting to provide the linear relationship by changing (Pm/Ph)/(Pm×2/Ph×2) depending on the recording speed so that the relationship between (Pm/Ph)/(Pm×2/Ph×2) and the recording speed is not affected by the unsaturation phenomenon of the laser power by substituting the vertical axis shown in FIG. 16 with the value (Pm/Ph)/(Pm×2/Ph×2) obtained by normalizing the ratio Pm/Ph of the laser power level with the ratio Ph×2/Pm×2 of the laser power level in the ×2 speed recording.

Similar results are also obtained even when the ratio of Pm/Ph plotted on the vertical axis of FIG. 16 is normalized with a ratio Pm×2/Ph×2 of Pm/Ph at a certain recording linear velocity, for example, in the ×2 speed recording as shown in FIG. 17. That is, when the relationship between (Pm/Ph)/(Pm×2/Ph×2) and the recording speed is linearly approximated in a convenient manner beforehand so that the unsaturation level to be generated is exceeded as shown by a thick line shown in FIG. 17, it is also possible to determine the value of Pm by using the value of Ph from the value of Pm/Ph by determining the recording speed without being affected by the unsaturation phenomenon which would be otherwise caused by the rising time and the falling time of the laser power.

This simulation is illustrative of the case in which Tr/Tr=1, i.e., Tr=Tf is given. However, even in the case of Tr/Tr<1 or Tr/Tf>1, the same or equivalent effect is obtained in the same manner as in the case of Tr/Tf=1.0 irrelevant to the value of Tr/Tf by setting the certain relationship for the laser powers Ph, Pm, and Pl and the recording linear velocity in the same manner as in the case described above on condition that Tr/Tf is determined to be another value beforehand. When the certain relationship is established between the laser powers Ph, Pm, and Pl and the speed during the recording in the same manner as described above after determining the value of Tr/Tf approximately at the center of the assumed variation, it is possible to suppress and minimize the variation of the optimum value of the laser power which would be otherwise caused by the variation of the value of Tr/Tf.

EXAMPLES

Examples of the present invention will be described, in which experiments were actually performed on the basis of the results obtained by the simulation described above.

The following layers were formed by means of the sputtering process on a polycarbonate substrate with a radius of 120 mm and a thickness of 0.6 mm having a surface covered with concave/convex guide grooves with a groove depth of 65 nm and a track pitch of 1.2 μm based on the format of 4.7 GB DVD-RAM. That is, those successively formed as films were 100 nm of ZnS—SiO$_2$ as a first protective layer, 10 nm of GeCrN as a first interface layer, 10 nm of BiGeTe as a recording layer, 10 nm of GeCrN as a second interface layer, 50 nm of ZnS—SiO$_2$ as a second protective layer, 50 nm of GeCr as a heat absorption factor-correcting layer, and 80 nm of Al as a heat-diffusing layer to obtain an information-recording medium used for Examples.

Figure 18:
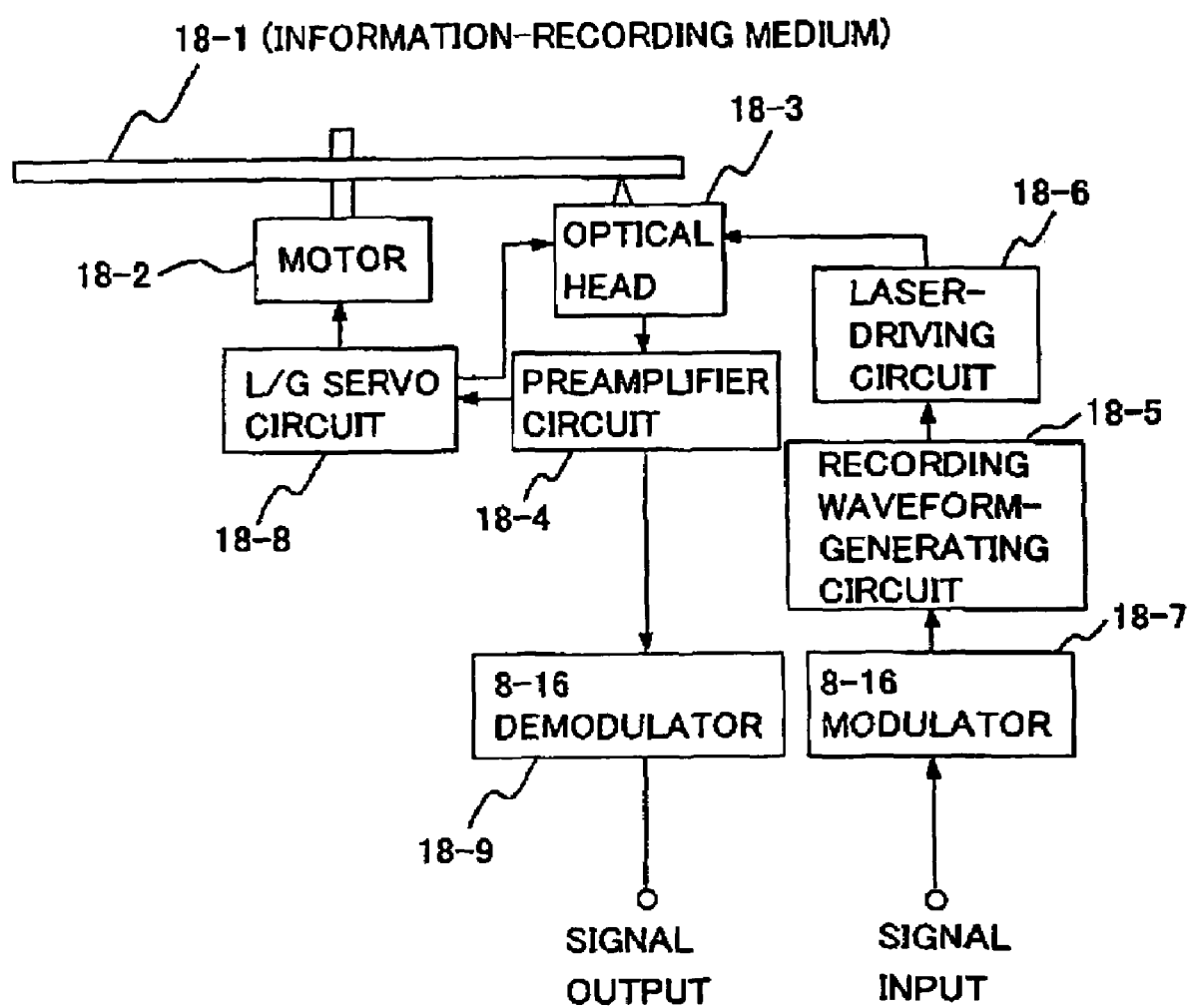
FIG. 18 schematically shows an information-recording and reproducing apparatus for optical recording media used to investigate the recording and reproduction characteristics in embodiments of the present invention.

The information-recording medium was subjected to the crystallization by using a laser initializing apparatus. When the recording and reproduction characteristics were investigated thereafter, an information-recording and reproducing apparatus for optical recording media as shown in FIG. 18 was used.

An explanation will be made below about the operation and the recording and reproduction process of the information-recording and reproducing apparatus for optical recording media used in Examples of the present invention. At first, the information, which is supplied from the outside of the recording apparatus, is transmitted in units each composed of 8 bits to an 8-16 modulator 18-7. When the information is recorded on the information-recording medium 18-1, the apparatus uses a modulation system for converting 8-bit information into those of 16 bits, i.e., the so-called 8-16 modulation system. In this modulation system, the information is recorded with mark lengths of 3T to 14T allowed to correspond to the information of 8 bits. In the drawing, the 8-16 modulator 18-7 performs this modulation. T herein represents the clock length of the data during the information recording. In this embodiment, the clock length was 17.1 ns when the recording linear velocity was 8.2 m/s, and the clock length was 6.9 ns when the recording linear velocity was 20.5 m/s.

Figure 19:
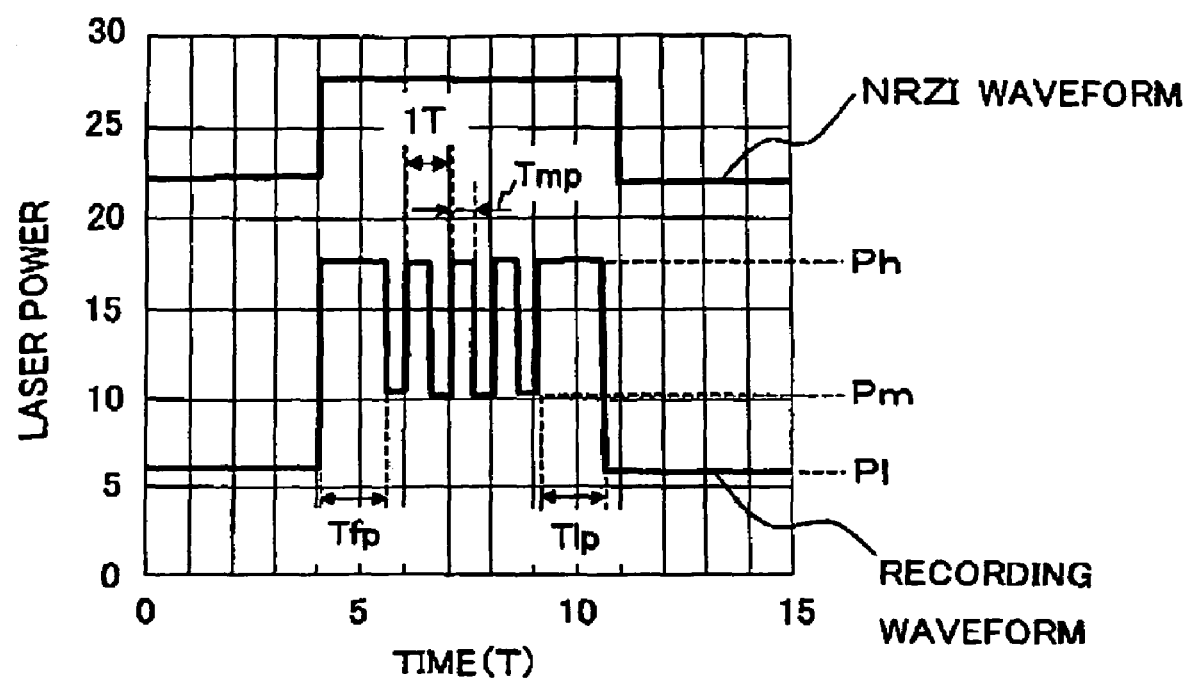
FIG. 19 explains the strategy of recording pulses used to investigate the recording and reproduction characteristics in embodiments of the present invention.

The digital signals of 3T to 14T, which are converted by the 8-16 modulator 18-7, are transferred to a recording waveform-generating circuit 18-5 to generate a multi-pulse recording waveform in which the pulse having the power at the first power level Ph as the high power has a width of about T/2, the laser is radiated at the second power level Pl or the third power level Pm between the first power level Ph and the second power level Pl having a width of about T/2 during the period of time of the radiation of the laser of Ph, and the laser is radiated at Pm or the intermediate power level Pl between a series of pulses at the Ph level. In the recording waveform-generating circuit 18-5, the signals of 3T to 14T are allowed to alternately correspond to "0", "1", and "2" in a time series manner. The laser power at the power level of Pl is radiated in the case of "0", the laser power at the power level of Pm is radiated in the case of "1", and the laser power at the power level of Ph is radiated in the case of "21". During this procedure, the portion on the information-recording medium 18-1, which is radiated with the laser beam at the power level of Pl, is changed to the crystal. The portion, which is radiated with a series of pulse sequence including pulses at the power level of Ph, is changed to the amorphous (mark portion). The recording waveform-generating circuit 18-5 has a multi-pulse waveform table corresponding to the system (adaptive recording waveform control) in which the width Tfp of the leading pulse and the width Tlp of the tail pulse of the multi-pulse waveform as shown in FIG. 19 are changed depending on the space lengths before and after the mark portion when the series of pulse sequence including the pulses at the power level of Ph for forming the mark portion is formed. Accordingly, the multi-pulse recording waveform (laser-driving signal) is generated, which makes it possible to maximally exclude the influence of the thermal interference between the marks which would be otherwise caused between the marks.

The recording waveform, which is generated by the waveform-generating circuit 18-5, is transferred to a laser-driving circuit 18-6. The laser-driving circuit 18-6 allows a semiconductor laser contained in an optical head 18-3 to emit light. The semiconductor laser having a wavelength of 655 nm is used to produce a laser beam for recording the information for the optical head 18-3 carried on the information-recording and reproducing apparatus for optical recording media of this embodiment. The laser beam is focused on the recording layer of the information-recording medium 18-1 by using an objective lens having NA of 0.6 to perform the recording by radiating the laser beam of the laser corresponding to the recording waveform as described above.

The information-recording and reproducing apparatus for optical recording media of this embodiment is adapted to the system (so-called land-groove recording system) in which the information is recorded on both of the groove and the land (area between the grooves). The information-recording and reproducing apparatus for optical recording media of this embodiment includes an L/G servo circuit 18-8 which makes it possible to arbitrarily select the tracking for the land and the groove. The recorded information was reproduced by using the optical head 18-3 as well. The laser beam is radiated onto the recorded marks, and the reflected light beam is detected from the marks and the portions other than the marks to obtain a reproduced signal. The amplitude of the reproduced signal is amplified by a preamplifier circuit 18-4, which is transferred to an 8-16 demodulator 18-9. The 8-16 demodulator 18-9 makes conversion into 8-bit information for every unit of 16 bits. As a result of the operation as described above, the reproduction from the recorded marks is completed. When the recording is performed on the optical information-recording medium 18-1 under the condition described above, then the mark length of the 3T mark as the shortest mark is about 0.42 μm, and the mark length of the 14T mark as the longest mark is about 1.96 μm.

When the jitter was evaluated, the following procedure was adopted. That is, a random pattern signal including 3T to 14T was recorded and reproduced, and a reproduced signal was subjected to the processes of waveform equivalence, binary conversion, and PLL (Phase Locked Loop) to measure the jitter.

In the embodiment of the present invention, an apparatus A and an apparatus B were used, in which only the characteristics of the optical head 18-3 and the laser-driving circuit 18-6 were different from each other in the recording and reproducing apparatus for optical recording media described above. The values of the rising time Tr and the falling time Tf of the laser power are as follows in the apparatus A and the apparatus B. That is, Tr=2.7 ns and Tf=2.4 ns are given in the case of the apparatus A, and Tr=1.1 ns and Tf=0.9 ns are given in the case of the apparatus B. In this embodiment, Tr and Tf were measured in accordance with the following procedure. The laser beam was subjected to the voltage conversion by using a photoelectric power converter to make the display on an oscilloscope. The period of time, in which the output is raised from 10% to 90%, was regarded as Tr, and the period of time, in which the output is lowered from 90% to 10%, was regarded as Tf.

An explanation will be made below about the procedure in which the apparatuses for evaluating optical recording media having different Tr's and Tf's were used to record data while changing the construction (recording strategy) of the recording pulse sequence and the recording linear velocity, the data was reproduced while changing the reproducing linear velocity, and the value of the jitter was investigated during the data reproduction for the compatibility of the recording and reproduction between the apparatuses. In this embodiment, the ×2 speed recording is performed while setting the recording linear velocity to 8.2 m/s, the clock length of the recording data to 17.1 ns, and the data transfer rate to 22 Mbps. Further, the ×5 speed recording is performed while setting the recording linear velocity to 20.5 m/s, the clock length of the recording data to 6.9 ns, and the data transfer rate to 55 Mbps.

The jitter was measured as follows. That is, a random pattern was recorded ten times in an order from the inner circumference to the outer circumference on continuous five tracks, and the value of the jitter was measured while setting the reproducing laser power to 1.0 mW on the central track of the five tracks. In this embodiment, the following setting is made. That is, the recording linear velocity in the ×5 speed recording is 20.5 m/s, the clock length is 6.9 ns, the target value of the jitter when the data transfer rate is 55 Mbps is not more than 8%, and the upper limit value of the standard is not more than 9%.

Examples of the recording method of the present invention will be described below. For the convenience of explanation, Comparative Examples will be firstly explained.

Comparative Example 1

Procedure 1-1

At first, the width of the leading pulse and the width of the tail pulse of the multi-pulse waveform were optimized for the information-recording medium by means of the adaptive recording waveform control on the land so that the power levels of Pm and Pl were equal to one another under a condition of the linear velocity of 8.2 m/s with the apparatus B in which the values of Tr and Tf were small (laser response characteristic was relatively satisfactory). A prepared recording strategy Sb0 was used to record a random signal on the groove and the land with the optimum powers. The signal was reproduced at a linear velocity of 8.2 m/s to investigate the reproduction jitter on the groove and the land. The optimum recording powers were determined as follows. That is, the values of Ph and Pl were determined by changing the power respectively so that the jitter was minimized.

Procedure 1-2

Subsequently, the optimum powers were determined on the groove and the land for the information-recording medium by using the recording strategy Sb0 prepared in Procedure 1-1 under a condition of the linear velocity of 8.2 m/s with the apparatus A in which Tr and Tf are large (laser response characteristic was relatively inferior). After that, a random signal was recorded. The signal was reproduced at a linear velocity of 8.2 m/s to investigate the reproduction jitter on the groove and the land. The optimum recording powers were determined by changing the values of Ph and Pl respectively so that the jitter was minimized.

Comparative Example 2

Procedure 2-1

In this case, the width of the leading pulse and the width of the tail pulse of the multi-pulse waveform were optimized for the information-recording medium by means of the adaptive recording waveform control on the land so that the power levels of Pm and Pl were equal to one another under a condition of the linear velocity of 20.5 m/s with the apparatus B. A prepared recording strategy Sb1 was used to record a random signal on the groove and the land with the optimum powers. The signal was reproduced at a linear velocity of 20.5 m/s to investigate the reproduction jitter on the groove and the land. The optimum recording powers were determined by changing the values of Ph and Pl respectively so that the jitter was minimized.

Procedure 2-2

Subsequently, the optimum powers were determined on the groove and the land so that the power levels of Pm and Pl were equal to one another for the information-recording medium by using the recording strategy Sb1 prepared in Procedure 2-1 under a condition of the linear velocity of 20.5 m/s with the apparatus A. After that, a random signal was recorded. The signal was reproduced at a linear velocity of 20.5 m/s to investigate the reproduction jitter on the groove and the land. The optimum recording powers were determined by changing the values of Ph and Pl respectively so that the jitter was minimized.

Example 1

Procedure 3-1

Further, the width of the leading pulse and the width of the tail pulse of the multi-pulse waveform were optimized by means of the adaptive recording waveform control on the land so that Pm/Ph=0.65 was satisfied with the apparatus B. A prepared recording strategy Sb2 was used to record a random signal on the groove and the land with the optimum powers. The signal was reproduced at a linear velocity of 20.5 m/s to investigate the reproduction jitter on the groove and the land. The optimum recording powers were determined by changing the values of Ph and Pl respectively so that the jitter was minimized. The value of Pm was determined from the determined value of Ph by using a relational expression of Pm 0.65 *Ph.

Procedure 3-2, 3-3

On the other hand, the signal recorded with the apparatus B was reproduced at linear velocities of 20.5 m/s and 8.2 m/s with the apparatus A to investigate the reproduction jitter on the groove and the land.

Procedure 3-4

Subsequently, the optimum powers were determined on the groove and the land so that Pm/Ph=0.65 was satisfied for the information-recording medium by using the recording strategy Sb2 optimized with the apparatus B under a condition of the linear velocity of 20.5 m/s with the apparatus A. After that, a random signal was recorded. The signal was reproduced at a linear velocity of 20.5 m/s to investigate the reproduction jitter on the groove and the land. The optimum recording powers were determined by changing the values of Ph and Pl respectively so that the jitter was minimized. The value of Pm was determined from the determined value of Ph by using a relational expression of Pm =0.65 *Ph.

Procedures 3-5, 3-6

On the other hand, the signal recorded with the apparatus A was reproduced at linear velocities of 20.5 m/s and 8.2 m/s with the apparatus B to investigate the reproduction jitter on the groove and the land.

Example 2

Procedure 4-1

Further, the width of the leading pulse and the width of the tail pulse of the multi-pulse waveform were optimized by means of the adaptive recording waveform control on the land so that Pm/Ph=0.75 was satisfied with the apparatus B. A prepared recording strategy Sb3 was used to record a random signal on the groove and the land with the optimum powers. The signal was reproduced at a linear velocity of 20.5 m/s to investigate the reproduction jitter on the groove and the land. The optimum recording powers were determined by changing the values of Ph and Pl respectively so that the jitter was minimized. The value of Pm was determined from the determined value of Ph by using a relational expression of Pm=0.75 *Ph.

Procedures 4-2, 4-3

On the other hand, the signal recorded with the apparatus B was reproduced at linear velocities of 20.5 m/s and 8.2 m/s with the apparatus A to investigate the reproduction jitter on the groove and the land.

Procedure 4-4

Subsequently, the optimum powers were determined on the groove and the land so that Pm/Ph=0.75 was satisfied for the information-recording medium by using the recording strategy Sb3 optimized with the apparatus B under a condition of the linear velocity of 20.5 m/s with the apparatus A. After that, a random signal was recorded. The signal was reproduced at a linear velocity of 20.5 m/s to investigate the reproduction jitter on the groove and the land. The optimum recording powers were determined by changing the values of Ph and Pl respectively so that the jitter was minimized. The value of Pm was determined from the determined value of Ph by using a relational expression of Pm=0.75 *Ph.

Procedures 4-5, 4-6

On the other hand, the signal recorded with the apparatus A was reproduced at linear velocities of 20.5 m/s and 8.2 m/s with the apparatus B to investigate the reproduction jitter on the groove and the land.

As described above, the apparatuses for evaluating the optical information-recording medium, in which Tr and Tf were different from each other, were used to record the data while changing the construction of the recording pulse sequence (recording strategy) and the recording linear velocity. Further, the data was reproduced while changing the reproducing linear velocity to investigate the value of the jitter during the data reproduction in relation to the compatibility in the recording and reproduction between the apparatuses. Obtained results are summarized in Table 1. In Table 1, the unsaturation level is represented by the numerical value calculated by (Pm−Pl)/(Ph−Pl).

TABLE 1-1

| Procedure | Recording strategy | Recording apparatus | Recording linear velocity (m/s) | Reproducing apparatus | Reproducing linear velocity (m/s) |
|---|---|---|---|---|---|
| Comp. Ex. 1 | | | | | |
| 1-1 | Sb0 | B | 8.2 | B | 8.2 |
| 1-2 | Sb0 | A | 8.2 | A | 8.2 |
| Comp. Ex. 2 | | | | | |
| 2-1 | Sb1 | B | 20.5 | B | 20.5 |
| 2-2 | Sb1 | A | 20.5 | A | 20.5 |
| Ex. 1 | | | | | |
| 3-1 | Sb2 | B | 20.5 | B | 20.5 |
| 3-2 | Sb2 | B | 20.5 | A | 20.5 |
| 3-3 | Sb2 | B | 20.5 | A | 8.2 |
| 3-4 | Sb2 | A | 20.5 | A | 20.5 |
| 3-5 | Sb2 | A | 20.5 | B | 20.5 |
| 3-6 | Sb2 | A | 20.5 | B | 8.2 |
| Ex. 2 | | | | | |
| 4-1 | Sb3 | B | 20.5 | B | 20.5 |
| 4-2 | Sb3 | B | 20.5 | A | 20.5 |
| 4-3 | Sb3 | B | 20.5 | A | 8.2 |
| 4-4 | Sb3 | A | 20.5 | A | 20.5 |
| 4-5 | Sb3 | A | 20.5 | B | 20.5 |
| 4-6 | Sb3 | A | 20.5 | B | 8.2 |

TABLE 1-2

| Procedure | Groove/land | Ph (mW) | Pl (mW) | Pm (mW) | Pm/Ph | Pm/Pl | Unsaturation level | Jitter (%) |
|---|---|---|---|---|---|---|---|---|
| Comp. Ex. 1 | | | | | | | | |
| 1-1 | Groove | 10.2 | 4.2 | 4.2 | 0.41 | 1.00 | 0.00 | 8.5 |
| | Land | 10.5 | 4.4 | 4.4 | 0.42 | 1.00 | 0.00 | 8.2 |
| 1-2 | Groove | 10.0 | 4.2 | 4.2 | 0.42 | 1.00 | 0.00 | 8.6 |
| | Land | 10.4 | 4.4 | 4.4 | 0.42 | 1.00 | 0.00 | 8.4 |
| Comp. Ex. 2 | | | | | | | | |
| 2-1 | Groove | 14.7 | 6.4 | 6.4 | 0.44 | 1.00 | 0.00 | 7.7 |
| | Land | 15.1 | 6.5 | 6.5 | 0.43 | 1.00 | 0.00 | 7.4 |
| 2-2 | Groove | 13.9 | 6.2 | 6.2 | 0.45 | 1.00 | 0.00 | 10.4 |
| | Land | 14.2 | 6.5 | 6.5 | 0.46 | 1.00 | 0.00 | 9.8 |
| Ex. 1 | | | | | | | | |
| 3-1 | Groove | 11.8 | 6.2 | 7.7 | 0.65 | 1.24 | 0.27 | 7.6 |
| | Land | 12.4 | 6.5 | 8.1 | 0.65 | 1.25 | 0.27 | 7.3 |
| 3-2 | Groove | — | — | — | — | — | — | 7.7 |
| | Land | — | — | — | — | — | — | 7.5 |
| 3-3 | Groove | — | — | — | — | — | — | 7.7 |
| | Land | — | — | — | — | — | — | 7.5 |
| 3-4 | Groove | 11.7 | 6.2 | 7.6 | 0.65 | 1.23 | 0.25 | 7.7 |
| | Land | 12.2 | 6.5 | 7.9 | 0.65 | 1.22 | 0.25 | 7.4 |
| 3-5 | Groove | — | — | — | — | — | — | 7.6 |
| | Land | — | — | — | — | — | — | 7.4 |
| 3-6 | Groove | — | — | — | — | — | — | 7.7 |
| | Land | — | — | — | — | — | — | 7.5 |
| Ex. 2 | | | | | | | | |
| 4-1 | Groove | 10.3 | 6.2 | 7.7 | 0.75 | 1.24 | 0.37 | 7.5 |
| | Land | 10.8 | 6.5 | 8.1 | 0.75 | 1.25 | 0.37 | 7.2 |
| 4-2 | Groove | — | — | — | — | — | — | 7.6 |
| | Land | — | — | — | — | — | — | 7.4 |
| 4-3 | Groove | — | — | — | — | — | — | 7.7 |
| | Land | — | — | — | — | — | — | 7.5 |
| 4-4 | Groove | 10.2 | 6.2 | 7.6 | 0.75 | 1.23 | 0.35 | 7.6 |
| | Land | 10.6 | 6.5 | 7.9 | 0.75 | 1.22 | 0.34 | 7.3 |
| 4-5 | Groove | — | — | — | — | — | — | 7.6 |
| | Land | — | — | — | — | — | — | 7.4 |
| 4-6 | Groove | — | — | — | — | — | — | 7.7 |
| | Land | — | — | — | — | — | — | 7.4 |

At first, as understood from Comparative Example 1 shown in Table 1, the jitter, which is produced by the apparatus A during the recording and reproduction, has approximately the same value as that of the jitter which is produced by the apparatus B during the recording and reproduction when the recording is performed at the optimum powers with the apparatus A in which Tr and Tf are relatively large, i.e., 2.7 ns and 2.4 ns respectively by using the recording strategy Sb0 obtained by performing the optimization with the apparatus B in which the rising time Tr and the falling time Tf of the laser power are small, i.e., 1.1 ns and 0.9 ns respectively if the clock length is 17.1 ns and the recording linear velocity in the ×2 speed recording is 8.2 m/s on condition that the second recording power level Pl is the same as the third power level Pm.

However, as understood from Comparative Example 2 as well, the jitter, which is produced during the recording and reproduction with the apparatus B, is not more than 8% of the target, while the jitter, which is produced during the recording and reproduction with the apparatus A, exceeds 9% which is the upper limit of the standard when the recording is performed at the optimum powers with the apparatus A by using the recording strategy Sb1 obtained by performing the optimization with the apparatus. B if the clock length is 6.9 ns and the recording linear velocity in the ×5 speed recording is 20.5 m/s on condition that the second recording power level Pl is the same as the third power level Pm. According to this fact, it is understood that the compatibility of the recording cannot be established between the apparatuses in which Tr and Tf are different from each other when the recording linear velocity is increased. In Comparative Example 1, Pm/Ph=0.43 to 0.46 is given for the ratio between the first power level Ph and the third power level Pm, and the value of 0 is given for the numerical value (Pm−Pl)/(Ph−Pl) which represents the unsaturation level of the laser power.

As Example 1, the following is illustrative of the case in which the third power level Pm is changed depending on the recording linear velocity, and the ratio Pm/Ph between the first power level Ph and the third power level Pm is set to 0.65, i.e., Pm/Ph=0.65. When the recording and reproduction are performed with the apparatus B at the linear velocity of 20.5 m/s by using the recording strategy Sb2 obtained by performing the optimization with the apparatus B on condition that the recording linear velocity in the ×5 speed recording is 20.5 m/s, then the value of the jitter, which is obtained in this case, is approximately the same as the value obtained in Comparative Example 2, which is not more than 8% of the target. The values of the jitter, which are obtained when the data recorded with the apparatus B is reproduced at the linear velocities of 20.5 m/s and 8.2 m/s with the apparatus A, are also approximately the same as those obtained when the reproduction is performed with the apparatus B, which are not more than 8% of the target. Further, when the recording and reproduction are performed at the optimum powers determined to satisfy Pm/Ph=0.65 by using the recording strategy Sb2 at the linear velocity of 20.8 m/s with the apparatus A, the jitter has approximately the same value as that obtained when the recording and reproduction. are performed with the apparatus B, which is not more than 8% of the target. The values of the jitter, which are obtained when the data recorded with the apparatus A is reproduced at the linear velocities of 20.5 m/s and 8.2 m/s with the apparatus B, are also approximately the same as those obtained when the reproduction is performed with the apparatus B, which are not more than 8% of the target. According to this fact, it is appreciated that the recording compatibility can be established between the apparatuses in which Tr and Tf are different from each other even when the recording linear velocity is increased, by changing the third power level Pm depending on the recording linear velocity and establishing Pm/Ph=0.65. In Example 1, the value of the numerical value (Pm−Pl)/(Ph−Pl) for representing the unsaturation level of the laser power is 0.25 to 0.27. As shown in Table 1, the ratio Pm/Pl of the power level Pm with respect to the power level Pl is 1.22 to 1.25. When the third power level Pm is adjusted in response to the recording linear velocity, Pm/Pl or (Pm−Pl)/(Ph−Pl) for representing the unsaturation level of the laser power may be adjusted in response to the linear velocity.

Further, as Example 2, the following is illustrative of the case in which the third power level Pm is changed depending on the recording linear velocity, and the ratio Pm/Ph between the first power level Ph and the third power level Pm is set to 0.75, i.e., Pm/Ph=0.75. When the recording and reproduction are performed with the apparatus B at the linear velocity of 20.5 m/s by using the recording strategy Sb3 obtained by performing the optimization with the apparatus B on condition that the recording linear velocity in the ×5 speed recording is 20.5 m/s, then the value of the jitter, which is obtained in this case, is approximately the same as the value obtained in Comparative Example 2, which is not more than 8% of the target. The values of the jitter, which are obtained when the data recorded with the apparatus B is reproduced at the linear velocities of 20.5 m/s and 8.2 m/s with the apparatus A, are also approximately the same as those obtained when the reproduction is performed with the apparatus B, which are not more than 8% of the target.

Further, when the recording and reproduction are performed at the optimum powers determined to satisfy Pm/Ph=0.75 by using the recording strategy Sb3 at the linear velocity of 20.8 m/s with the apparatus A, the jitter has approximately the same value as that obtained when the recording and reproduction are performed with the apparatus B, which is not more than 8% of the target. The values of the jitter, which are obtained when the data recorded with the apparatus A is reproduced at the linear velocities of 20.5 m/s and 8.2 m/s with the apparatus B, are also approximately the same as those obtained when the reproduction is performed with the apparatus B, which are not more than 8% of the target. According to this fact, it is appreciated that the recording compatibility can be established between the apparatuses in which Tr and Tf are different from each other even when the recording linear velocity is increased, by changing the third power level Pm depending on the recording linear velocity and establishing Pm/Ph=0.75. In Example 2, the value of the numerical value (Pm−Pl)/(Ph−Pl) for representing the unsaturation level of the laser power is 0.34 to 0.37. As shown in Table 1, the ratio Pm/Pl of the power level Pm with respect to the power level Pl is 1.22 to 1.25. When the third power level Pm is adjusted in response to the recording linear velocity, Pm/Pl or (Pm−Pl)/(Ph−Pl) for representing the unsaturation level of the laser power may be adjusted in response to the linear velocity.

As described above, in principle, the determination of the optimum recording power resides in the complicated step of determining the three values of Ph, Pl, and Pm. On the contrary, when the value of Ph/Pm, (Pm−Pl)/(Ph−Pl), or Pm/Pl is established depending on the recording speed, the value of Pm can be determined from the value of Ph. Therefore, the determination of the optimum recording power can be simplified into the step of determining the two values of Ph and Pl.

As understood from the fact that the values of Ph in Examples 1 and 2 of the present invention are smaller than the value of Ph in Comparative Example 2, it is possible to decrease the maximum level of the recording power when the present invention is used. According to this fact, when the present invention is applied to the information-recording apparatus which has the upper limit of the output value of the laser power, an effect is obtained such that the recording linear velocity and the data transfer rate can be further enhanced, and the clock length of the recording data can be further shortened. Further, it is also possible to reduce the load on the laser.

Further reference may be made, for example, to the pulse width of the 7T signal after the 3T signal in the recording strategies Sb1, Sb2, and Sb3 used in Examples. The pulse width Tfp of the leading pulse and the pulse width Tlp of the tail pulse shown in FIG. 19 are as follows on the basis of the clock length T. That is, Tfp=1.75T and Tlp=0.63T are given in the case of Sb1, Tfp=2.06T and Tlp =0.56T are given in the case of Sb2, and Tfp=2.38T and Tlp=0.50T are given in the case of Sb3. As described above, the values of Tfp and Tlp are changed in the respective recording strategies. Therefore, the optimization of the recording strategy can be performed in a simplified manner by changing the pulse width Tfp of the leading pulse and the pulse width Tlp of the tail pulse of the recording strategy depending on the recording linear velocity, the third power level Pm, the ratio Pm/Ph between the first power level Ph and the third power level Pm, the numerical value (Pm−Pl)/(Ph−Pl) for representing the unsaturation level of the laser power, and/or Pm/Pl. consequently, it is also possible to simplify the step of optimizing the recording power to be performed with the optimum recording strategy.

In the above embodiments, the recording with the CLV system was shown as example. However, the present invention can also be applied to the recording with the CAV system. In this case, the linear velocity differs depending on the radial position on the disk-shaped medium as well as the recording speed, such as the ×2 speed, the ×3 speed and the ×5 speed. Accordingly, the parameters such as Pm, Pm/Pl, Pm/Ph are adjusted depending on the radial position on the disk-shaped medium as well as the optimum recording power in accordance with the present invention.

As explained above, according to the present invention, the optimum recording laser power can be easily established for the information-recording apparatus while considering the influence of the rising time and the falling time of the laser when the linear velocity of the data recording and the data transfer rate are increased. Further, according to the present invention, the recording compatibility can be secured between the information-recording apparatuses in which the linear velocity of the data recording, the data transfer rate, and the rising time and the falling time of the laser are different from each other.

In Examples of the present invention, the recording compatibility has been verified by using the strategy optimized with the apparatus B in which the rising time and the falling time of the laser are small. However, according to the present invention, it has been successfully confirmed that the recording compatibility is obtained even in the case of the use of a strategy optimized with the apparatus A in which the rising time and the falling time of the laser are large.

The expression of "laser beam" is adopted in this specification. However, the effect of the present invention is obtained provided that any energy beam is. used, which makes it possible to change the state of the information-recording portion of the information-recording medium according to the present invention. Therefore, the effect of the present invention is not lost even when an energy beam such as an electron beam is used.

In Examples of the present invention, the red laser having the wavelength of 655 nm is used. However, the present invention does not specifically depend on the wavelength of the laser. The present invention also exhibits the effect on the information-recording apparatus to use any laser having a relatively short wavelength including, for example, blue lasers and ultraviolet lasers, as well as on the information-recording medium to be used therefor.

In Examples of the present invention, the phase-change disk is used for the information-recording medium. However, the present invention is applicable to any information-recording medium provided that information is recorded thereon by being irradiated with the energy beam. Therefore, the present invention is also applicable to any information-recording medium other than the disk-shaped information-recording medium, including, for example, optical cards, especially irrelevant to the material and the structure for constructing the information-recording medium and the shape of the information-recording medium.

The present invention resides in the information-recording method comprising the steps of relatively scanning the information-recording medium and the laser beam at the linear velocity within the certain range and changing the state of the information-recording portion of the information-recording medium to record information thereby by using the pulse sequence composed of the plurality of pulses with the power level of the first power level Ph while power-modulating the laser power of the laser beam to at least the first power level Ph and the second power level Pl which is lower than the first power level, wherein the power level, which is provided between the plurality of pulses, is the third power level Pm between the first power level Ph and the second power level Pl, and the third power level Pm is changed in response to the linear velocity. Accordingly, it is possible to secure the compatibility of the recording between the information-recording apparatuses in which the linear velocity during the recording and the rising time and the falling time of the laser power are different from each other.

Further, the recording power can be optimized with ease by increasing Pm in proportion to the linear velocity.

What is claimed is:

1. An information-recording method for recording information on an information-recording medium, the information-recording method comprising:
   moving a light beam at a selected linear velocity relative to the information-recording medium;
   controlling the light beam to generate a multi-pulse having at least three power levels of a first power level Ph, a second power level Pl which is lower than the first power level, and a third power level Pm which is between the first and second power levels, the multi-pulse being repeatedly modulated between the first power level Ph and the third power level Pm, the second power level Pl being smaller than the third power level Pm, the second power level Pl being a crystallization level;
   adjusting the third power level Pm in response to the selected linear velocity; and
   recording the information by irradiating the information-recording medium with the controlled light beam including the adjusted third power level to change a state of an irradiated portion of the information-recording medium,
   wherein a ratio (Pm−Pl)/(Ph−Pl) of a difference between the third power level Pm and the second power level Pl with respect to a difference between the first power level Ph and the second power level Pl is adjusted in response to the linear velocity.

2. The information-recording method according to claim 1, wherein the third power level Pm is adjusted so that the third power level Pm is increased in proportion to the linear velocity.

3. The information-recording method according to claim 1, wherein the ratio (Pm−Pl)/(Ph−Pl) is adjusted so that the ratio (Pm−Pl)/(Ph−Pl) is increased in proportion to the linear velocity.

4. The information-recording method according to claim 1, wherein a pulse width of a leading pulse or a tail pulse of the multi-pulse is adjusted in response to the third power level Pm.

5. The information-recording method according to claim 4, wherein the pulse width of the leading pulse or the tail pulse of the multi-pulse is adjusted so that the pulse width is increased in proportion to the third power level Pm.

6. The information-recording method according to claim 1, wherein a pulse width of a leading pulse or a tail pulse of the multi-pulse is adjusted in response to a ratio Pm/Ph of the third power level Pm with respect to the first power level Ph.

7. The information-recording method according to claim 6, wherein the pulse width of the leading pulse or the tail pulse of the multi-pulse is adjusted so that the pulse width is increased in proportion to the ratio Pm/Ph of the third power level Pm with respect to the first power level Ph.

8. The information-recording method according to claim 1, further comprising reading the selected linear velocity from the information-recording medium before recording the information, wherein the information is recorded with a CLV system.

9. The information-recording method according to claim 1, wherein the information is recorded with a CAV system, and the selected linear velocity differs depending on a position on the information-recording medium in which the information is recorded.

10. An information-recording method for recording information on an information-recording medium, the information-recording method comprising:
    moving a light beam at a selected linear velocity relative to the information-recording medium;

controlling the light beam to generate a multi-pulse having at least three power levels of a first power level Ph, a second power level Pl which is lower than the first power level, and a third power level Pm which is between the first and second power levels, the multi-pulse being repeatedly modulated between the first power level Ph and the third power level Pm, the second power level Pl being smaller than the third power level Pm, the second power level Pl being a crystallization level;

adjusting the third power level Pm in response to the selected linear velocity; and recording the information by irradiating the information-recording medium with the controlled light beam including the adjusted third power level to change a state of an irradiated portion of the information-recording medium, wherein a pulse width of a leading pulse or a tail pulse of the multi-pulse is adjusted in response to a ratio (Pm−Pl)/(Ph−Pl) of a difference between the third power level Pm and the second power level Pl with respect to a difference between the first power level Ph and the second power level Pl.

11. The information-recording method according to claim 10, wherein the pulse width of the leading pulse or the tail pulse of the multi-pulse is adjusted so that the pulse width is increased in proportion to the ratio (Pm−Pl)/(Ph−Pl) of the difference between the third power level Pm and the second power level Pl with respect to the difference between the first power level Ph and the second power level Pl.

12. An information-recording medium for recording information by irradiating the information-recording medium with a light beam to change a state of an irradiated portion of the information-recording medium, the information-recording medium comprising:

a recording layer which causes the change of state;

a substrate which supports the recording layer; and management information which is recorded on the substrate or the recording layer, wherein:

the radiating light beam is modulated to contain a multi-pulse having at least three power levels of a first power level Ph, a second power level Pl which is lower than the first power level, and a third power level Pm which is between the first and second power levels, the multi-pulse being repeatedly modulated between the first power level Ph and the adjusted third power level Pm, the second power level Pl being smaller than the third power level Pm, the second power level Pl being a crystallization level; and the management information includes information which relates to a linear velocity for moving the light beam relative to the information-recording medium and information which relates to the first power level Ph, the second power level Pl, and the third power level Pm adjusted in response to the linear velocity, and the management information includes information which represents a ratio (Pm−Pl)/(Ph−Pl) of a difference between the third power level Pm and the second power level Pl with respect to a difference between the first power level Ph and the second power level Pl.

13. The information-recording medium according to claim 12, wherein the management information includes a ratio Pm/Ph between the first power level Ph and the third power level Pm.

14. The information-recording medium according to claim 13, wherein the ratio Pm/Ph is adjusted in response to the linear velocity.

15. The information-recording medium according to claim 12, wherein the ratio (Pm−Pl)/(Ph−Pl) is adjusted in response to the linear velocity.

16. The information-recording medium according to claim 12, wherein the management information includes information which represents a ratio Pm/Pl between the third power level Pm and the second power level Pl, and the ratio Pm/Pl is adjusted in response to the linear velocity.

17. The information-recording medium according to claim 12, wherein the management information includes values of the first power level Ph, the second power level Pl, and the third power level Pm at a plurality of recording speeds respectively.

18. The information-recording medium according to claim 17, wherein a value of (Pm−Pl)/(Ph−Pl) at a high linear velocity is larger than a value of (Pm−Pl)/(Ph−Pl) at a low linear velocity.

19. The information-recording medium according to claim 12, wherein the information is recorded with a CLV system or a CAV system.

20. A method for controlling a light power for recording information on an information-recording medium by using a light beam having at least three power levels of a first power level Ph, a second power level Pl which is lower than the first power level, and a third power level Pm which is between the first and second power levels, the method for controlling the light power comprising:

adjusting the third power level Pm in response to a linear velocity defined by the information-recording medium; and controlling the light power to generate a multi-pulse which is repeatedly modulated at least between the first power level Ph and the adjusted third power level Pm, the second power level Pl being smaller than the third power level Pm and being a crystallization level, a value of (Ph−Pm) at a high linear velocity is smaller than a value of (Ph−Pm) at a low linear velocity;

a value of the first power level Ph at the high linear velocity is larger than a value of the first power level Ph at the low linear velocity, and at least one of Pm/Pl, Pm/Ph, and a ratio (Pm−Pl)/(Ph−Pl) is adjusted in response to the linear velocity when the third power level Pm is adjusted in response to the linear velocity determined depending on the information-recording medium.

* * * * *

UNITED STATES PATENT AND TRADEMARK OFFICE
CERTIFICATE OF CORRECTION

PATENT NO. : 7,477,587 B2  
APPLICATION NO. : 10/734148  
DATED : January 13, 2009  
INVENTOR(S) : Naoki Kitagaki and Makoto Miyamoto Page 1 of 1

It is certified that error appears in the above-identified patent and that said Letters Patent is hereby corrected as shown below:

Title Page, Item (73) Assignee, should read:

(73) Assignee: Hitachi Maxell, Ltd., Osaka (JP)

Signed and Sealed this

Twenty-fourth Day of March, 2009

JOHN DOLL  
*Acting Director of the United States Patent and Trademark Office*